United States Patent
Davies

(10) Patent No.: US 7,536,508 B2
(45) Date of Patent: May 19, 2009

(54) SYSTEM AND METHOD FOR SHARING SATA DRIVES IN ACTIVE-ACTIVE RAID CONTROLLER SYSTEM

(75) Inventor: Ian Robert Davies, Longmont, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 420 days.

(21) Appl. No.: 11/557,178

(22) Filed: Nov. 7, 2006

(65) Prior Publication Data

US 2008/0005470 A1    Jan. 3, 2008

Related U.S. Application Data

(60) Provisional application No. 60/806,316, filed on Jun. 30, 2006.

(51) Int. Cl.
*G06F 12/00* (2006.01)
(52) U.S. Cl. ................ 711/114; 711/156; 711/170; 714/6; 714/7
(58) Field of Classification Search ................ 711/114, 711/156, 170; 714/6, 7
See application file for complete search history.

(56) References Cited

U.S. PATENT DOCUMENTS

| | | |
|---|---|---|
| 4,217,486 A | 8/1980 | Tawfik et al. |
| 4,251,869 A | 2/1981 | Shaffer |
| 4,428,044 A | 1/1984 | Liron |
| 5,345,565 A | 9/1994 | Jibbe et al. |
| 5,408,644 A | 4/1995 | Schneider et al. |
| 5,483,528 A | 1/1996 | Christensen |

(Continued)

FOREIGN PATENT DOCUMENTS

EP    0800138 A    10/1997

(Continued)

OTHER PUBLICATIONS

Young et al. *A high I/O reconfigurable crossbar switch*. 11th Annual IEEE Symposium on Field-Programmable Custom Computing Machines, 2003. FCCM 2003. Apr. 9-11, 2003. pp. 3-10.

(Continued)

*Primary Examiner*—Stephen C Elmore
(74) *Attorney, Agent, or Firm*—E. Alan Davis; James W. Huffman

(57) ABSTRACT

An active-active RAID system includes first and second active-active RAID controllers which efficiently share access to SATA drives. SAS expanders connect the RAID controllers to the drives. The controllers establish an affiliation within the SAS expanders with respectively-owned first and second subsets of the SATA drives. The controllers directly transmit to the SAS expanders commands destined for affiliated drives, but forward to the other RAID controller, via an inter-controller communications link, commands destined for unaffiliated drives for transmission by the other RAID controller. The controllers handle drive ownership changes by clearing previously-established affiliations, updating ownership data stored on the drives, including forwarding the update commands as necessary, and re-establishing affiliations based on the new ownership. In response to a SAS configuration change, the controllers clear all affiliations, and employ a distributed lock mechanism to ensure exclusive access to perform the SAS discover process and read ownership data.

60 Claims, 8 Drawing Sheets

U.S. PATENT DOCUMENTS

| | | | |
|---|---|---|---|
| 5,530,842 | A | 6/1996 | Abraham et al. |
| 5,553,023 | A | 9/1996 | Lau et al. |
| 5,613,068 | A | 3/1997 | Gregg et al. |
| 5,619,642 | A | 4/1997 | Nielson et al. |
| 5,619,644 | A | 4/1997 | Crockett et al. |
| 5,668,956 | A | 9/1997 | Okazawa et al. |
| 5,680,579 | A | 10/1997 | Young et al. |
| 5,706,283 | A | 1/1998 | Suzuki |
| 5,754,884 | A | 5/1998 | Swanstrom |
| 5,802,602 | A | 9/1998 | Rahman et al. |
| 5,812,754 | A | 9/1998 | Lui et al. |
| 5,881,254 | A | 3/1999 | Corrigan et al. |
| 6,009,275 | A | 12/1999 | DeKoning et al. |
| 6,038,680 | A | 3/2000 | Olarig |
| 6,058,455 | A | 5/2000 | Islam et al. |
| 6,094,699 | A | 7/2000 | Surugucchi et al. |
| 6,098,140 | A | 8/2000 | Pecone et al. |
| 6,185,652 | B1 | 2/2001 | Shek et al. |
| 6,223,252 | B1 | 4/2001 | Bandera et al. |
| 6,243,829 | B1 | 6/2001 | Chan |
| 6,272,533 | B1 | 8/2001 | Browne |
| 6,397,293 | B2 | 5/2002 | Shrader et al. |
| 6,421,769 | B1 | 7/2002 | Teitenberg et al. |
| 6,438,603 | B1 | 8/2002 | Ogus |
| 6,470,429 | B1 | 10/2002 | Jones et al. |
| 6,493,795 | B1 | 12/2002 | Arsenault et al. |
| 6,502,157 | B1 | 12/2002 | Batchelor et al. |
| 6,507,581 | B1 | 1/2003 | Sgammato |
| 6,629,179 | B1 | 9/2003 | Bashford |
| 6,718,408 | B2 | 4/2004 | Esterberg et al. |
| 6,732,243 | B2 | 5/2004 | Busser et al. |
| 6,839,788 | B2 | 1/2005 | Pecone |
| 6,912,621 | B2 | 6/2005 | Harris |
| 7,046,668 | B2 | 5/2006 | Pettey et al. |
| 7,069,368 | B2 | 6/2006 | Thornton |
| 7,071,946 | B2 | 7/2006 | Jeddeloh |
| 7,107,343 | B2 | 9/2006 | Rinaldis et al. |
| 7,457,902 | B2 * | 11/2008 | Yang et al. ............... 710/200 |
| 2001/0013076 | A1 | 8/2001 | Yamamoto |
| 2002/0029319 | A1 | 3/2002 | Robbins et al. |
| 2002/0069317 | A1 | 6/2002 | Chow et al. |
| 2002/0069334 | A1 | 6/2002 | Hsia et al. |
| 2002/0083111 | A1 | 6/2002 | Row et al. |
| 2002/0091828 | A1 | 7/2002 | Kitamura et al. |
| 2002/0099881 | A1 | 7/2002 | Gugel |
| 2002/0194412 | A1 | 12/2002 | Bottom |
| 2003/0065733 | A1 | 4/2003 | Pecone |
| 2003/0065836 | A1 | 4/2003 | Pecone |
| 2003/0217211 | A1 | 11/2003 | Rust et al. |
| 2004/0064638 | A1 | 4/2004 | Chong, Jr. |
| 2004/0177126 | A1 | 9/2004 | Maine |
| 2004/0221198 | A1 | 11/2004 | Vecoven |
| 2005/0044169 | A1 | 2/2005 | Arbeitman et al. |
| 2005/0102549 | A1 * | 5/2005 | Davies et al. ............... 714/4 |
| 2005/0102557 | A1 | 5/2005 | Davies et al. |
| 2006/0106982 | A1 | 5/2006 | Ashmore et al. |
| 2006/0161707 | A1 | 7/2006 | Davies et al. |
| 2006/0161709 | A1 | 7/2006 | Davies |
| 2006/0230218 | A1 * | 10/2006 | Warren et al. ............... 710/315 |
| 2006/0242312 | A1 * | 10/2006 | Crespi et al. ............... 709/230 |
| 2006/0248308 | A1 | 11/2006 | Wang et al. |
| 2006/0248400 | A1 | 11/2006 | Miyamoto |
| 2006/0277347 | A1 | 12/2006 | Ashmore et al. |
| 2006/0282701 | A1 | 12/2006 | Davies et al. |
| 2008/0005410 | A1 * | 1/2008 | Mies et al. ............... 710/62 |
| 2008/0201616 | A1 | 8/2008 | Ashmore |

FOREIGN PATENT DOCUMENTS

| | | |
|---|---|---|
| EP | 0817054 | 1/1998 |
| EP | 0967552 | 12/1999 |
| GB | 2396726 A | 6/2004 |
| JP | 2001142648 | 5/2001 |
| WO | WO0182077 | 11/2001 |
| WO | WO2006124217 | 11/2006 |
| WO | WO2007002219 | 1/2007 |

OTHER PUBLICATIONS

Landman et al. *Activity-sensitive architectural power analysis.* IEEE Transactions on Computer-Aided Design of Integrated Circuits and Systems. Jun. 1996. pp. 571-587.

U.S. Office Action for U.S. Appl. No. 09/967,027, Apr. 30, 2004, pp. 1-7 and cover sheet.

U.S. Office Action for U.S. Appl. No. 09/967,126, Mar. 7, 2005, pp. 1-5 and cover sheet.

European Examination Report for Application No. GB0406742.7, dated Nov. 10, 2004, pp. 1-4.

European Examination Report for Application No. GB0406739.3, dated Nov. 10, 2004, pp. 1-2.

European Examination Report for Application No. GB0406740.1, dated Nov. 10, 2004, pp. 1-2.

"PCI-X Synthesizable Core." inSilicon Corporation. San Jose, CA. 1999. pp. 1-2.

"IBM 133 PCI-X Bridge" Datasheet. Apr. 6, 2001. pp. 7-11.

"IBM 133 PCI-X Bridge" Datasheet 2000. IBM Microelectronics Division. pp. 1-4.

"Tsi320™ Software Initialization Application Note." Oct. 2001. 80A600B_AN002_01. Tundra Semiconductor Corporation. pp. 1-36.

"PCI-X Bus Test Environment." 1999. inSilicon Corporation 411 East Plumeria Dr. San Jose, CA 95134. pp. 1-2.

"Compaq Rapid Enabler for PCI-X (CREX) Initiator Interface." (Preliminary). Revision 0.28 Sep. 2, 1999. pp. 1-64.

"Compaq Rapid Enabler for PCI-X (CREX) Target Bus Interface." (Preliminary). Revision 0.36 Sep. 2, 1999. pp. 1-58.

"Intel 41210 Serial to Parallel PCI Bridge Product Brief." Intel Corporation. 2003. pp. 1-4.

IDT. "24-lane 3-Port PCI Express Switch" Product Brief. 89PES24N3. Dec. 22, 2005. Integrated Device Technology, Inc. pp. 1-2.

"PEX 8104" Data Book. Version 0.61. Mar. 2004. PLX Technology, Inc. pp. 1-1 to 1-11.

"PEX 8114 PCI Express to PCI/PCI-X Bridge." Product Brief. Version 2.0. 2004. PLX Technology, Inc. pp. 1-4.

"Tsi320™ PCI/X-to-PCI/X Bus Bridge Manual." Jan. 2001. 80A600B_MA001_02. Tundra Semiconductor Corporation pp. 33-36.

"Tsi320™ Dual-Mode PCI-to-PCI Bus Bridge Errata." Sep. 2001. 80A600B_ER001_05. Tundra Semiconductor Corporation. pp. 1-18.

"Tsi320™ Dual-Mode PCI-to-PCI Bus Bridge User Manual." Jun. 2001. 80A600B_MA001_04. Tundra Semiconductor Corporation. pp. 25-32.

"X-caliber Design Specification: PCI-2.2/PCI-X Megacell" Rev 0.99.3. Nov. 19, 1999. pp. 9-21.

"PEX 8114: PCI-X -PCI Express Bridge." Data Book. Version 0.70. May 2004. PLX Technology, Inc. pp. 17-29.

IDT. "24-lane 3-Port PCI Express Switch" Data Sheet. 89HPES24N3. Feb. 14, 2006. Integrated Device Technology, Inc. pp. 1-29.

IDT. "12-lane 3-Port PCI Express Switch" Data Sheet. 89HPES12N3. Feb. 14, 2006. Integrated Device Technology, Inc. pp. 1-28.

IDT. "12-lane 3-Port PCI Express Switch" Product Brief. 89PES12N3. Feb. 15, 2006. Integrated Device Technology, Inc. pp. 1-2.

"Intel 41210 Serial to Parallel PCI Bridge Datasheet." Intel Corporation. Sep. 2003. pp. 1-46.

"Intel 41210 Serial to Parallel PCI Bridge Design Guide." Intel Corporation. Nov. 2003. pp. 1-63.

"QL5064—QuickPCI™" DataSheet, Rev B. Feb. 2, 2000. QuickLogic. pp. 1-34.

"IDT 89HPES12N3 PCI Express Switch." User Manual Table of Contents & Overview. Integrated Device Technology. Feb 8, 2006. pp. 1-16.

"IDT 89HPES24N3 PCI Express Switch." User Manual Table of Contents & Overview. Integrated Device Technology. Feb. 8, 2006. pp. 1-16.

Budruk et al. "PCI Express System Architecture." Addison Wesley Professional. Sep. 4, 2003, hand-numbered pp. 1-16.

LSI Corporation. MegaRAID SAS 8408E. Product Brief. 2007. pp. 1-2.

PCI-SIG. PCI Express Base Specification Revision 1.0A. Apr. 15, 2003, pp. 1-2.

Makijarvi, Petri. "PICMG1.3 SHB Raid Performance: Evaluating Next Generation High-Performance PC 4U Computers." Jul. 4, 2007. pp. 1-16.

Luse, Paul. "The Benefits of RAID on Motherboard." May 2003. pp. 1-4.

Overland Storage. "Tiered Data Protection Made Simple." 2008. pp. 1-11.

* cited by examiner

SYSTEM AND METHOD FOR SHARING SATA DRIVES IN ACTIVE-ACTIVE RAID CONTROLLER SYSTEM

CROSS REFERENCE TO RELATED APPLICATION(S)

This application claims priority to U.S. Provisional Application No. 60/806,316, filed Jun. 30, 2006, which is hereby incorporated by reference.

BACKGROUND OF THE INVENTION

Field of the Invention

The present invention relates in general to the field of Serial AT Attachment (SATA) drives, and particularly to their use in multi-initiator systems.

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disk drives in such a manner as to present a single logical disk drive (or multiple logical disk drives) to a computer operating system. RAID controllers employ the techniques of data striping and data redundancy to increase performance and data availability.

One technique for providing high data availability in RAID systems is to include redundant fault-tolerant RAID controllers in the system. Providing redundant fault-tolerant RAID controllers means providing two or more controllers such that if one of the controllers fails, one of the other redundant controllers continues to perform the function of the failed controller. For example, some RAID controllers include redundant hot-pluggable field replaceable units (FRUs) such that when a controller fails, an FRU can be quickly replaced in many cases to restore the system to its original data availability level.

In order for the surviving controller to continue to perform the function of the failed controller, it must be capable of accessing the disk drives that were previously controlled by the failed controller. This is particularly important in active-active RAID systems, in which each of the RAID controllers may simultaneously issue commands to a given disk drive. Thus, traditionally, redundant RAID systems, such as active-active RAID systems, have used disk drives such as SCSI or Fibre Channel drives that support the ability to concurrently receive and process commands from multiple initiators.

Serial Attached SCSI (SAS) is a serial interconnect version of the popular parallel SCSI interface. SAS is becoming popular in RAID systems. SAS systems are built on point-to-point serial connections between SAS devices. Each point-to-point connection is referred to as a link, or lane, and the two endpoints are referred to as a PHY. SAS systems employ expanders as fan-out devices to perform a switch-like function for interconnecting multiple SAS storage devices to SAS initiators, such as RAID controllers with SAS interfaces. Like its parallel predecessor, SAS drives support the ability to concurrently receive and process commands from multiple initiators.

Serial AT Attachment (SATA) disk drives are low cost, high capacity drives, which makes them attractive as data storage devices in RAID applications. SATA disk drives are interoperable with SAS disk drives within a SAS domain. In particular, the SATA Tunneled Protocol (STP) provides a means for SAS/SATA initiators to communicate with SATA disks over the SAS hardware infrastructure. However, SATA drives have evolved from the older AT standard that envisioned only a single initiator. This single-initiator limitation of SATA drives introduces problems in active-active RAID systems which require multi-initiator capability.

Implementations and uses of SAS, SATA, and STP are described in detail in the following documents, each of which is incorporated by reference in its entirety for all intents and purposes:

- "Serial Attached SCSI-1.1 (SAS-1.1)", Revision 10, Sep. 21, 2005. Working Draft, Project T10/1601-D, Reference number ISO/IEC 14776-151:200x. American National Standard Institute. (http://www.t10.org/ftp/t10/drafts/sas1/sas1r10.pdf)
- "Serial Attached SCSI-2 (SAS-2)", Revision 6, Sep. 22, 2006. Working Draft, Project T10/1760-D, Reference number ISO/IEC 14776-152:200x. American National Standard Institute. (http://www.t10.org/ftp/t10/drafts/sas2/sas2r06.pdf)
- "Serial ATA International Organization: Serial ATA Revision 2.5" specification, Oct. 27, 2005. Available for download at www.sata-io.org.

In SAS domains, SAS expanders allow SATA drives to be connected to SAS initiators, and ameliorate the single-initiator limitation of SATA drives by enforcing an affiliation, or association, between a SAS initiator and a target SATA drive. The affiliation operates as a lock that a SAS expander automatically takes out between a SAS initiator and a SATA target, unknown to the SATA drive. When a SAS initiator sends a command via STP to a SATA target through a SAS expander, the SAS expander creates an affiliation between the SAS initiator and the SATA target. Once the affiliation is created, the SAS expander prevents any other SAS initiator from sending a command to the affiliated target SATA drive. If the SAS expander maintaining the affiliation subsequently receives a command from a SAS initiator other than the SAS initiator for which the SAS expander is maintaining the affiliation, the SAS expander returns an error status in response to the command and does not route the command to the target SATA drive. The only means for releasing the affiliation are for the SAS initiator for which the affiliation is maintained to explicitly issue a command to the SAS expander to clear the affiliation, or for a PHY reset to be sent to the SAS expander PHY that is linked to the SATA drive. Neither of these means is very attractive for use in an active-active RAID controller system.

In an active-active RAID environment, using the PHY reset approach to clear an affiliation is undesirable for multiple reasons. First, the PHY reset also causes a hard reset to the SATA drive. Resetting the SATA drives may cause the drive to lose state, for example, a write-back cache disable state. Additionally, the reset causes a change in the SAS configuration that has a ripple effect, namely that the SAS initiators must rediscover the SAS configuration, which may be detrimental to performance, since the SAS discover process is relatively lengthy and prevents normal I/O commands from being issued in the meantime. Furthermore, the frequent issuance of clear affiliation commands is also inefficient since it would consume valuable bandwidth within the SAS domain.

Therefore, what is needed is a more efficient solution to using SATA drives in an active-active RAID system.

BRIEF SUMMARY OF INVENTION

The present invention provides an active-active RAID system that includes a communications link between the RAID controllers. The RAID controllers establish affiliations within SAS expanders between themselves and SATA drives they own. The RAID controllers directly transmit to the SAS expanders commands destined for affiliated SATA drives, but forward, via the communications link, commands destined for unaffiliated SATA drives.

In one aspect, the present invention provides an active-active RAID system for efficiently sharing Serial ATA (SATA) drives. The system includes first and second RAID controllers, each configured to couple to a plurality of SATA drives via one or more SAS expanders. The first RAID controller is configured to establish an affiliation in the one or more SAS expanders between the first RAID controller and each of a first subset of the plurality of SATA drives, and the second RAID controller is configured to establish an affiliation in the one or more SAS expanders between the second RAID controller and each of a second subset of the plurality of SATA drives. The first and second subsets of the plurality of SATA drives are mutually exclusive. The system also includes a communications link, for coupling the first and second RAID controllers to facilitate communications therebetween. The first RAID controller is configured to transmit commands destined for the first subset of the plurality of SATA drives to the one or more SAS expanders, and is configured to forward commands destined for the second subset of the plurality of SATA drives on the communications link to the second RAID controller for the second RAID controller to responsively transmit to the one or more SAS expanders. The second RAID controller is configured to transmit commands destined for the second subset of the plurality of SATA drives to the one or more SAS expanders, and is configured to forward commands destined for the first subset of the plurality of SATA drives on the communications link to the first RAID controller for the first RAID controller to responsively transmit to the one or more SAS expanders.

In another aspect, the present invention provides a method for efficiently sharing Serial ATA (SATA) drives in an active-active RAID system having first and second RAID controllers coupled to a plurality of SATA drives via one or more SAS expanders and a communications link between the first and second RAID controllers. The method includes establishing an affiliation in the one or more SAS expanders between the first RAID controller and each of a first subset of the plurality of SATA drives and establishing an affiliation in the one or more SAS expanders between the second RAID controller and each of a second subset of the plurality of SATA drives, wherein the first and second subsets of the plurality of SATA drives are mutually exclusive. The method also includes the first RAID controller transmitting commands destined for the first subset of the plurality of SATA drives to the one or more SAS expanders, and the first RAID controller forwarding commands destined for the second subset of the plurality of SATA drives on the communications link to the second RAID controller for the second RAID controller to responsively transmit to the one or more SAS expanders. The method also includes the second RAID controller transmitting commands destined for the second subset of the plurality of SATA drives to the one or more SAS expanders, and the second RAID controller forwarding commands destined for the first subset of the plurality of SATA drives on the communications link to the first RAID controller for the first RAID controller to responsively transmit to the one or more SAS expanders.

In another aspect, the present invention provides an active-active RAID system for changing an ownership state stored on a shared Serial ATA (SATA) drive. The system includes first and second RAID controllers, a communications link, connecting the first and second RAID controllers, and at least one SAS expander, configured to connect the first and second RAID controllers to the SATA drive. The first RAID controller is configured to clear at least one affiliation previously established in the at least one SAS expander between the first RAID controller and the SATA drive. The first RAID controller is configured to forward a command to write predetermined data to the SATA drive from the first RAID controller to the second RAID controller via the communications link, after clearing the affiliation. The predetermined data indicates the ownership state of the SATA drive. The second RAID controller is configured to transmit the forwarded command to the at least one SAS expander for subsequent transmission by the at least one SAS expander to the SATA drive.

In another aspect, the present invention provides a method for changing an ownership state stored on a Serial ATA (SATA) drive within an active-active RAID system having first and second RAID controllers and at least one SAS expander connecting the first and second RAID controllers to the SATA drive. The method includes the first RAID controller clearing at least one affiliation previously established in the at least one SAS expander between the first RAID controller and the SATA drive. The method includes the first RAID controller forwarding to the second RAID controller via a communications link a command to write predetermined data to the SATA drive, after clearing the affiliation. The predetermined data indicates the ownership state of the SATA drive. The method also includes the second RAID controller transmitting the command to the at least one SAS expander for subsequent transmission by the at least one SAS expander to the SATA drive, in response to the forwarding of the command.

In another aspect, the present invention provides an active-active RAID system for changing an ownership state stored on a shared Serial ATA (SATA) drive. The system includes first and second RAID controllers and first and second SAS expanders, configured to connect the respective first and second RAID controllers to the SATA drive. The first RAID controller is configured to clear an affiliation previously established in the second SAS expander between the first RAID controller and the SATA drive. The first RAID controller is configured to transmit to the first SAS expander a command to write predetermined data to the SATA drive for subsequent transmission by the first SAS expander to the SATA drive, after clearing the affiliation. The predetermined data indicates a free ownership state of the SATA drive (i.e., not owned by either of the RAID controllers). The first RAID controller is configured to notify the second RAID controller that the ownership state of the SATA drive has changed, after transmitting the command.

In another aspect, the present invention provides a method for changing an ownership state stored on a Serial ATA (SATA) drive within an active-active RAID system having first and second RAID controllers and respective first and second SAS expanders connecting the respective first and second RAID controllers to the SATA drive. The method includes the first RAID controller clearing an affiliation previously established in the second SAS expander between the first RAID controller and the SATA drive. The method also includes the first RAID controller transmitting to the first SAS expander a command to write predetermined data to the SATA drive for subsequent transmission by the first SAS expander to the SATA drive, after clearing the affiliation. The predetermined data indicates a free ownership state of the SATA drive. The method also includes the first RAID controller notifying the second RAID controller that the ownership state of the SATA drive has changed, after transmitting the command.

In another aspect, the present invention provides an active-active RAID system for sharing Serial ATA (SATA) drives. The system includes first and second RAID controllers and at least one SAS expander, configured to connect the first and second RAID controllers to the SATA drives. The first RAID controller is configured to obtain a lock that excludes the second RAID controller from accessing the SATA drives in response to receiving from the at least one SAS expander a SAS configuration change event broadcast primitive. The first RAID controller is configured to send a command to the second RAID controller to clear all affiliations established in the at least one SAS expander between the second RAID controller and the SATA drives after obtaining the lock. The first RAID controller is configured to read ownership information stored on the SATA drives while the second RAID controller is excluded from accessing the SATA drives after sending the command.

In another aspect, the present invention provides a method for sharing Serial ATA (SATA) drives by first and second RAID controllers within an active-active RAID system having at least one SAS expander connecting the first and second RAID controllers to the SATA drives. The method includes the first RAID controller obtaining a lock that excludes the second RAID controller from accessing the SATA drives, in response to receiving from the at least one SAS expander a SAS configuration change event broadcast primitive. The method also includes the first RAID controller sending a command to the second RAID controller to clear all affiliations established in the at least one SAS expander between the second RAID controller and the SATA drives, after obtaining the lock. The method also includes the first RAID controller reading ownership information stored on the SATA drives, while the second RAID controller is excluded from accessing the SATA drives, after sending the command.

DETAILED DESCRIPTION

Figure 1:
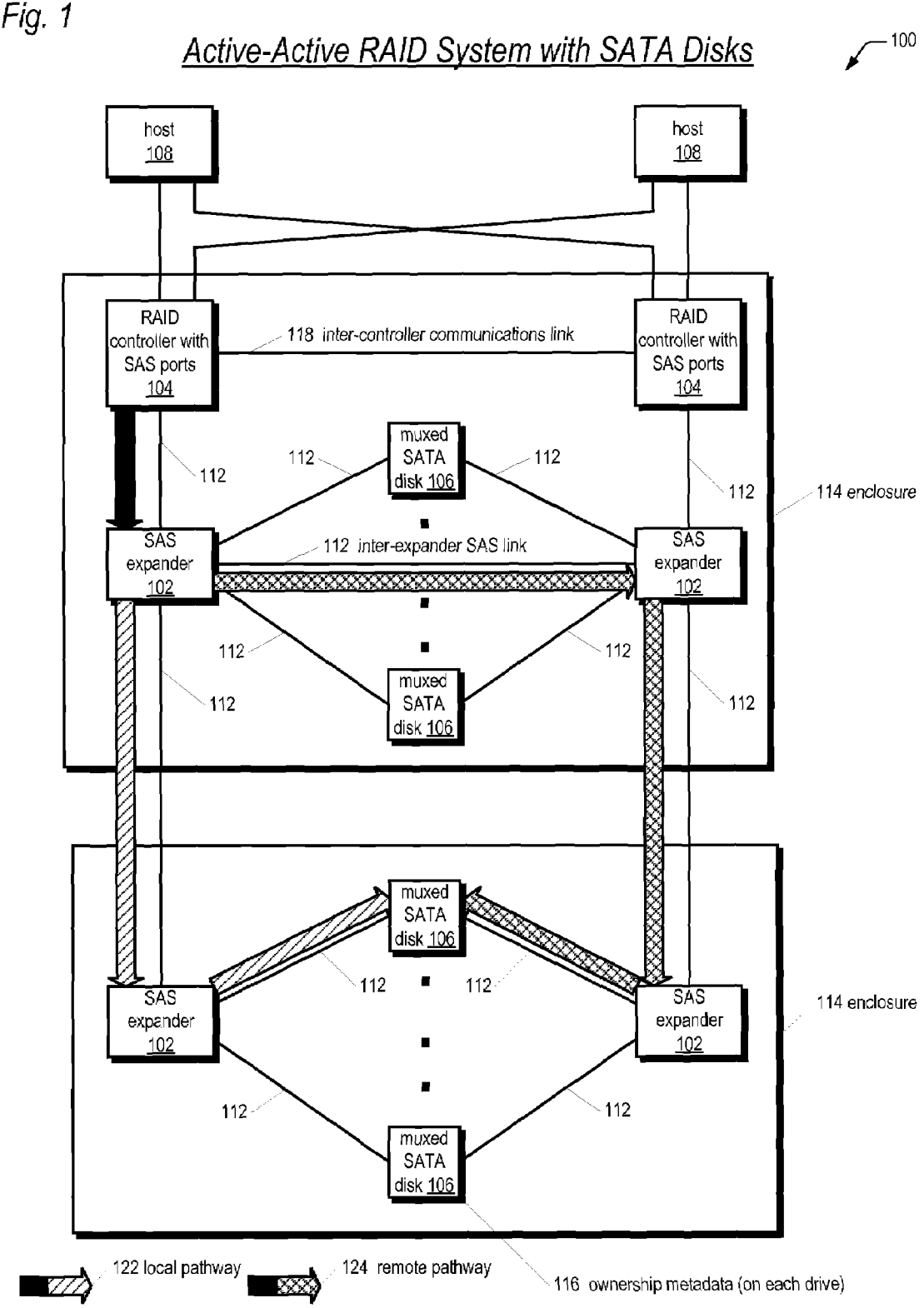
FIG. 1 is a block diagram of an active-active RAID system employing SATA disks according to the present invention.

Referring now to FIG. 1, a block diagram of an active-active RAID system 100 employing SATA disks 106 according to the present invention is shown. The system 100 includes two host computers 108 each coupled to two SAS-based RAID controllers 104, via a host interconnect such as Ethernet, FibreChannel, or the like. Each RAID controller 104 is coupled to a corresponding SAS expander 102 via a SAS link 112. Each of the SAS expanders 102 is coupled to a plurality of SATA disks 106 via a corresponding SAS link 112. Each SATA disk 106 is coupled to a 2-to-1 mux, or dongle. The mux receives the two SAS links 112 from the two SAS expanders 102 and muxes the SAS links 112 to the single port on the SATA disk 106. The mux enables both of the SAS expanders 102 to communicate with the SATA disk 106, as is well-known in the art of SAS/SATA systems.

The RAID controllers 104, SAS expanders 102, and SATA disks 106 are enclosed in an enclosure 114. An inter-expander SAS link 112 couples the SAS expanders 102 within the enclosure 114 housing the RAID controllers 104 and SAS expanders 102. Thus, the inter-expander SAS link 112 provides the possibility of two pathways through the SAS domain to each SATA disk 106. A pathway that includes the inter-expander SAS link 112 is referred to herein as a remote pathway, and a pathway that does not include the inter-expander SAS link 112 is referred to herein as a local pathway. An example of a remote pathway 124 is shown in FIG. 1 with cross-hatched thick arrows, and an example of a local pathway 122 is shown in FIG. 1 with striped thick arrows. When a RAID controller 104 decides to send a command to a SATA disk 106, the RAID controller 104 may choose to send the command via the local pathway or via the remote pathway. The RAID controller 104 may make the choice to send the command via the local or remote pathway based upon various factors, such as load balancing, which might affect performance, or whether one of the local or remote paths has failed. As discussed below, each RAID controller 104 maintains a flag (cmdForward flags 212 of FIG. 2) for the local and remote pathways for indicating whether a command destined for a SATA disk 106 via the respective pathway should be directly transmitted to the connected SAS expander 102 or forwarded to the partner RAID controller 104 so that the partner RAID controller 104 can transmit the command. The cmdForward flags 212 are populated based on SAS affiliations established within the SAS expanders 102 between the RAID controllers 104 and SATA disks 106, as discussed in more detail below. In one embodiment, a higher-level layer of code 214 (of FIG. 2) decides whether the command is destined for the SATA disk 106 via the local or remote path, and a lower-level of code 214 examines the appropriate local or remote cmdForward flag 212 to decide whether the command should be directly transmitted or forwarded to the partner RAID controller 104, as discussed in more detail below.

The system 100 also includes an inter-controller communications link 118 between the two RAID controllers 104 that enables the two RAID controllers 104 to communicate with one another. For example, the inter-controller communications link 118 may be used by the RAID controllers 104 to perform synchronization of the cache memory 216 of FIG. 2. Advantageously, as described in more detail below, if one of the RAID controllers 104 has established an affiliation with a SATA disk 106, the other RAID controller 104 forwards commands for the SATA disk 106 to the affiliated RAID controller 104 via the inter-controller link 118 and the affiliated RAID controller 104 transmits the command to the SATA disk 106 rather than the unaffiliated RAID controller 104 transmitting the command. This operation advantageously avoids the need to clear affiliations, resulting in more efficient sharing of the single-initiator-capable SATA disks 106. In one embodiment, the inter-controller communications link 118 is a PCI-Express link. U.S. patent application Ser. No. 11/178,727 filed Jul. 11, 2005, Ser. No. 11/329,470 filed Jan. 5, 2006, and Ser. No. 11/317,504 filed Dec. 22, 2005, each of which is hereby incorporated by reference in its entirety, describe embodiments in which the RAID controllers 104 communicate via the inter-controller communications link 118.

The system 100 of FIG. 1 also includes a second enclosure 114 similar to the first enclosure 114 described above; however, the second enclosure 114 does not include the RAID controllers 104, and is employed for enclosing only SATA disks 106 and two SAS expanders 102. Additionally, the SAS expanders 102 of the second enclosure 114 are not connected via an inter-expander SAS link 112, unlike the SAS expanders 102 in the RAID controller 104 enclosure, because the SAS specification does not allow loops within the SAS topology. Each SAS expander 102 in the first enclosure 114 is linked to a corresponding one of the SAS expanders 102 in the second enclosure 114 via a corresponding SAS link 112, which are 4× wide SAS links 112 in one embodiment. In one embodiment, each enclosure 114 may enclose up to 12 SATA disks 106, in addition to the RAID controllers 104, SAS expanders 102, power supplies, cooling systems, management controllers, and other components as are well known in the storage system industry.

Advantageously, the system 100 of FIG. 1 is arranged in a redundant manner to increase fault-tolerance of the system 100. In particular, each SATA disk 106 is accessible by each of the RAID controllers 104 so that if a RAID controller 104, SAS link 112, or SAS expander 102 fails, the hosts 108 may continue to access the SATA disks 106 via a surviving RAID controller 104 or SAS pathway. The SAS topology of the system 100 of FIG. 1 is provided to illustrate a possible SAS topology in which the present invention may be employed. However, the invention is not limited to the SAS topology shown, but may be employed in other SAS topologies in which active-active RAID controllers share access to a common set of SATA drives via a set of SAS expanders 102. For example, the present invention may also be employed in a SAS topology in which each of the RAID controllers 104 is connected to the same SAS expander 102. In some embodiments, the hosts 108 may also be included in the first enclosure 114.

In one embodiment, each of the SAS expanders 102 comprises a PM8388 SXP 24×3G 24-port SAS expander available from PMC-Sierra, Inc., of Santa Clara, Calif. In one embodiment, each of the SATA disk 106 muxes comprises a PM8307 SPS 3GT available from PMC-Sierra, Inc. In one embodiment, the muxes are active-active muxes, meaning the muxes automatically sense which of the two SAS links 112 is transmitting and select the transmitting SAS link 112. In one embodiment, the muxes receive an out-of-band control signal, such as a GPIO control input, used to control selection of the two SAS links 112. In one embodiment, the SAS links 112 between the RAID controllers 104 and the SAS expanders 102 are 4× wide SAS links. In one embodiment, the SAS links 112 between the SAS expanders 102 and the SATA disks 106 are narrow (i.e., 1×) SAS links 112. In one embodiment, SAS disks may also be included in the SAS domain 100 in addition to the SATA disks 106.

In one embodiment, each of the RAID controllers 104 owns a mutually exclusive subset of the SATA disks 106 of the system 100. That is, the owning RAID controller 104 receives the I/O requests from the hosts 108 for user data that is located on the SATA disks 106 owned by the owning RAID controller 104. Therefore, the owning RAID controller 104 establishes the affiliation with the SATA disk 106 and, during normal operation, the owning RAID controller 104 is responsible for sending to the owned SATA disk 106 the necessary disk commands to accomplish the host 108 I/O requests.

The RAID controllers 104 maintain a portion of the storage space on each of the SATA disks 106 for storage of metadata 116. The metadata 116 is non-user data that is privately maintained by the RAID controllers 104, such as for storing configuration data. In particular, the metadata 116 includes ownership data 116 that indicates which, if either, of the RAID controllers 104 owns the given SATA disk 106. Additionally, some of the SATA disks 106 may be free, i.e., not owned by either of the RAID controllers 104, which is indicated by the ownership metadata 116. The free SATA disks 106 may simply be drives that are available for configuration as part of a new disk array, also referred to as a logical disk or RAID set. Additionally, the RAID controllers 104 may employ the free SATA disks 106 as hot spare drives 106 for use in replacing a failed SATA disk 106 in a disk array to restore redundancy thereto.

Although, as discussed above, each RAID controller 104 owns a subset of the SATA disks 106 and is responsible for sending to the owned SATA disks 106 the necessary disk commands to accomplish the host 108 I/O requests, it is sometimes necessary during normal operation for the other RAID controller 104 to send commands to a SATA disk 106 that it does not own. For example, the non-owning RAID controller 104 may perform maintenance-type operations that require it to send commands to a SATA disk 106 that it does not own. For example, a non-owning RAID controller 104 may send a MODE SENSE, TEST UNIT READY, INQUIRY, or REQUEST SENSE command a non-owned SATA disk 106. Examples of requested mode sense pages may be the Self-Monitoring, Analysis, and Reporting Technology (SMART) mode page or the caching parameters mode page. For another example, a non-owning RAID controller 104 may send a READ or WRITE command to a non-owned SATA disk 106 to obtain or update age information which is included in the metadata 116 on the SATA disk 106.

As may be observed from the foregoing and from FIG. 1, the multi-initiator incapability of SATA disks 106 and the affiliation feature of the SATA Tunneled Protocol (STP) causes problems in an active-active RAID controller environment such as the system 100 of FIG. 1. For example, assume a first of the RAID controllers 104 sends a command to a SATA disk 106 within its enclosure 114 via its local pathway, i.e., through the first SAS expander 102 directly connected to the first RAID controller 104. This will establish an affiliation within the first SAS expander 102 between the RAID controller 104 and the SATA disk 106. Then, assume the second RAID controller 104 sends a command to the same SATA disk 106 via its remote pathway, i.e., through the second SAS expander 102 directly connected to the second RAID controller 104, which forwards the command over the inter-expander SAS link 112 to the first SAS expander 102. Because the first SAS expander 102 is maintaining the affiliation, it will return an error for the command to the second RAID controller 104. Advantageously, the present invention provides a solution to this problem. In particular, if a first RAID controller 104 has an affiliation established with a SATA disk 106 on a given SAS pathway and the second RAID controller 104 needs to send a command to the SATA disk 106, then the second RAID controller 104 forwards the command to the first RAID controller 104 via the inter-controller communications link 118 so that the first RAID controller 104 can transmit the command to the SATA disk 106 for the second RAID controller 104, thereby avoiding the affiliation error and the need to clear the affiliation.

Figure 2:
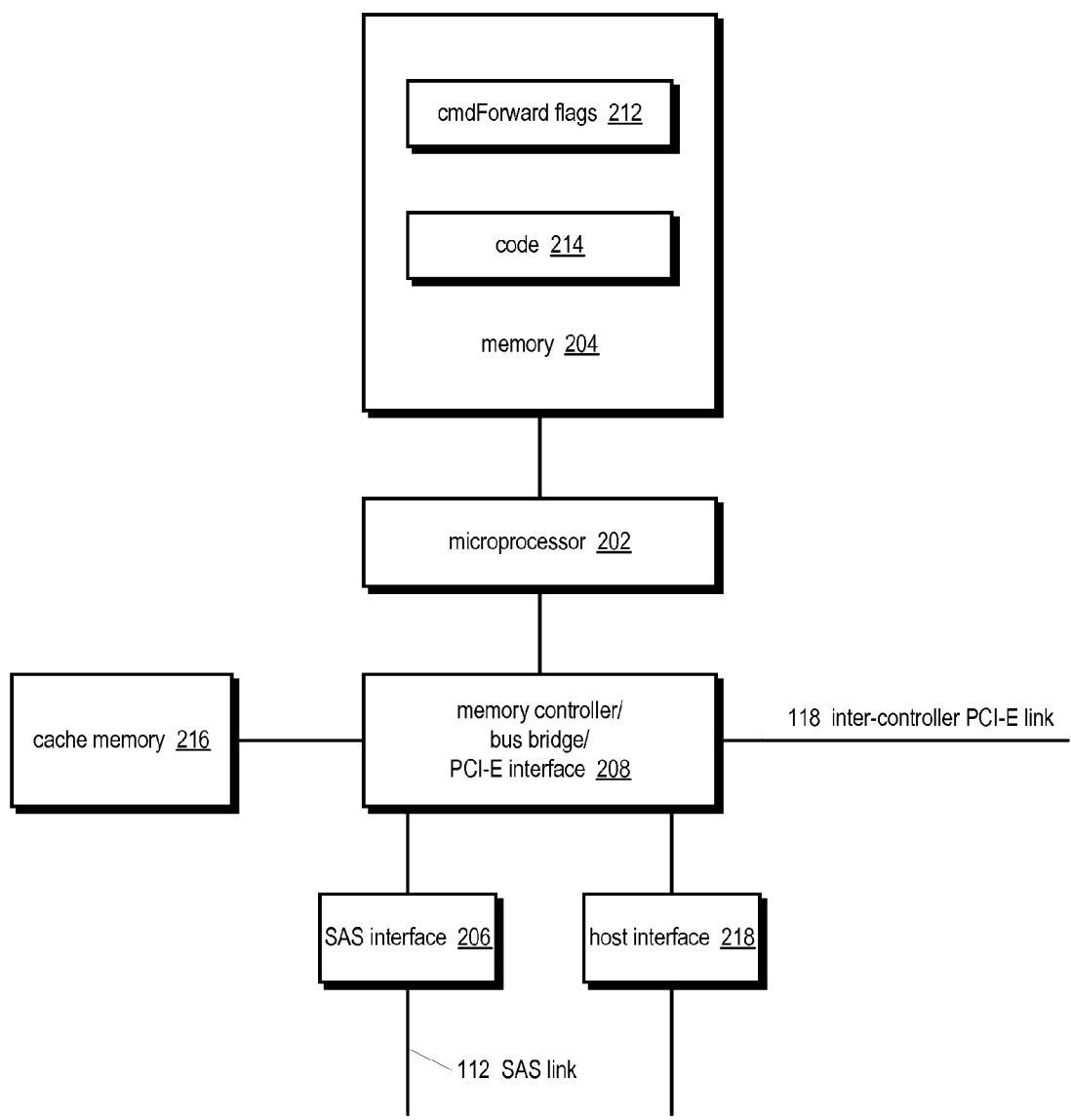
FIG. 2 is a block diagram illustrating in more detail a RAID controller of FIG. 1 according to the present invention.

Referring now to FIG. 2, a block diagram illustrating in more detail a RAID controller 104 of FIG. 1 according to the present invention is shown. The RAID controller 104 includes a microprocessor 202 coupled to a memory 204 and a memory controller/bus bridge/PCI-Express interface controller 208. The memory 204 is used to store program code instructions 214 for execution by the microprocessor 202 to perform most of the operations performed by the RAID controller 104 described herein. Additionally, the memory 204 stores cmdForward flags 212, which are used by the microprocessor 202 to determine whether to transmit an I/O command that is destined for a SATA disk 106 directly to the SATA disk 106 via the SAS expander 102 connected to the RAID controller 104, or to forward the I/O command to the partner RAID controller 104 via the inter-controller communications link 118 so that the partner RAID controller 104 can transmit the I/O command to the SATA disk 106, as described in more detail below.

The RAID controller 104 also includes a host interface controller 218 coupled to the memory controller/bus bridge/PCI-Express interface controller 208. The host interface 218 interfaces the RAID controller 104 to the host computers 108 via a host interface, such as Ethernet, FibreChannel, or other high-speed host interface.

The RAID controller 104 also includes a SAS interface controller 206 coupled to the memory controller/bus bridge/PCI-Express interface controller 208. The SAS interface 206 includes a SAS port for connecting the RAID controller 104 to a SAS port of a SAS expander 102 via a SAS link 112 of FIG. 1.

The RAID controller 104 also includes a cache memory 216 coupled to the memory controller/bus bridge/PCI-Express interface controller 208. The cache memory 216 buffers data transferred between the SATA disks 106 via the SAS interface 206, and between the hosts 108 via the host interface 218. Thus, for example, the RAID controller 104 may receive from a host 108 an I/O request to read data. In response, the RAID controller 104 may issue a READ command to one or more SATA disks 106 to read data. The data may be transferred from the SATA disk 106 to the cache memory 216 via the SAS interface 206 in response to the READ command, and subsequently transferred from the cache memory 216 to a host 108 via the host interface 218. If the RAID controller 104 subsequently receives from a host 108 an I/O request for the data and the data is still in the cache memory 216, the RAID controller 104 may immediately supply the data from the cache memory 216. Conversely, the RAID controller 104 may receive from a host 108 an I/O request to write data. In response, the RAID controller 104 may receive the data from the host 108 into the cache memory 216 via the host interface 218. The RAID controller 104 may subsequently issue a WRITE command to one or more SATA disks 106 and transfer the data from the cache memory 216 to the SATA disk 106 via the SAS interface 206. If the I/O request implicates a redundant RAID array, the RAID controller 104 may also generate and write redundancy data to one or more of the SATA disks 106 in the disk array.

The memory controller/bus bridge/PCI-Express interface controller 208 includes a bus interface for connecting to a bus that couples the memory controller/bus bridge/PCI-Express interface controller 208 to the microprocessor 202, such as a PCI bus or processor bus. The memory controller/bus bridge/PCI-Express interface controller 208 also includes a memory controller that couples the memory controller/bus bridge/PCI-Express interface controller 208 to the cache memory 216, such as via a high-speed memory bus. The memory controller/bus bridge/PCI-Express interface controller 208 also includes bus interfaces for connecting to respective buses that couple the memory controller/bus bridge/PCI-Express interface controller 208 to the SAS interface 206 and host interface 218, such as PCI buses. The memory controller/bus bridge/PCI-Express interface controller 208 also includes an interface that couples the memory controller/bus bridge/PCI-Express interface controller 208 to the inter-controller communications link 118 of FIG. 1 for facilitating communications with the partner RAID controller 104 of FIG. 1, such as the forwarding of commands between the RAID controllers 104 and the transfer of data associated with the forwarded commands between the RAID controllers 104, as described herein. In one embodiment, the interface is a PCI-Express interface. The memory controller/bus bridge/PCI-Express interface controller 208 includes bus bridging circuitry for bridging the various buses and accommodating the transfer of data and commands between the microprocessor 202, cache memory 216, SAS interface 206, host interface 218, and PCI-Express link 118.

Figure 3:
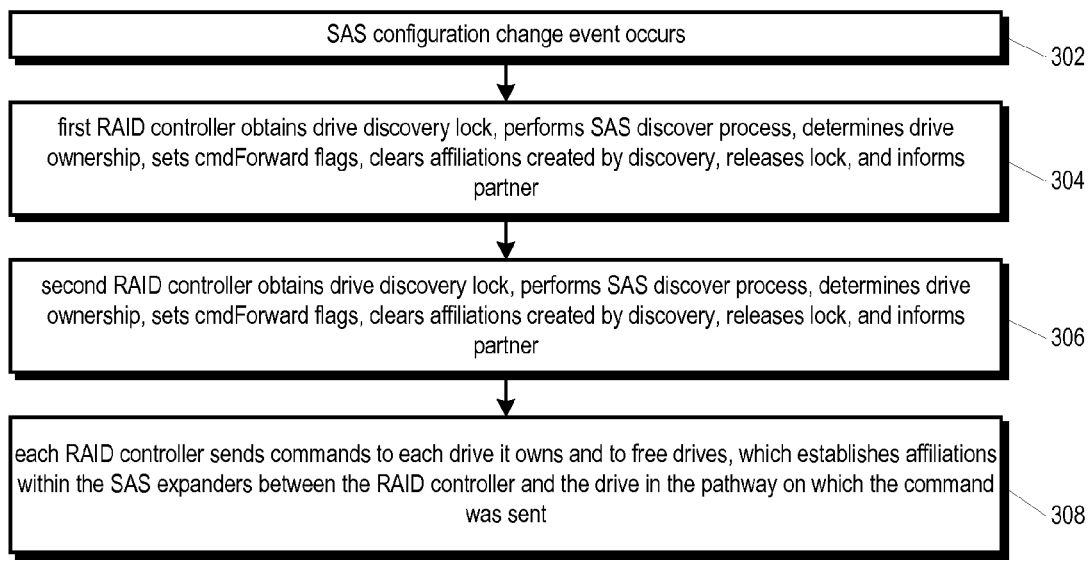
FIG. 3 is a flowchart illustrating operation of the active-active RAID system of FIG. 1 in response to a SAS configuration change event according to the present invention.

Referring now to FIG. 3, a flowchart illustrating operation of the active-active RAID system 100 of FIG. 1 in response to a SAS configuration change event according to the present invention is shown. According to the SAS standard, a SAS expander is required to transmit a BROADCAST primitive on each of its SAS ports to notify other SAS devices of a configuration change event within the SAS domain. Examples of SAS change events include a SAS link becoming operational, a SAS link becoming non-operational, a SAS device being removed, a SAS device being added, and so forth. Each time a SAS initiator receives the BROADCAST primitive it is required to perform a SAS discover process to discover the device type, SAS address, and supported protocols of each SAS device in the SAS domain 100 and to configure routing tables within the SAS expanders 102 as needed. In addition, as described herein, when each RAID controller 104 is performing the SAS discover process, the RAID controller 104 also determines the ownership of each SATA disk 106 by reading the ownership metadata 116 of FIG. 1 and sets the cmdForward flags 212 of FIG. 2 appropriately.

As described herein, generally during normal operation, the RAID controllers 104 directly transmit commands to their associated SAS expander 102 for transmission to affiliated SATA disks 106; and the RAID controllers 104 forward commands to the partner RAID controller 104 via the inter-controller communications link 118 that are destined for SATA disks 106 which are affiliated with the partner RAID controller 104. However, when a SAS configuration change event occurs, the RAID controllers 104 cooperatively clear any existing affiliations and allow each other to have a turn of unrestricted access to all the SATA disks 106 of the active-active RAID controller 104 system 100 to perform the SAS discover process and to determine the ownership of each SATA disk 106. The RAID controllers 104 cooperate by communicating via the inter-controller communications link 118, and in particular by alternately obtaining ownership of a lock for the purpose of performing the SAS discover and drive ownership determination process. After each RAID controller 104 performs the SAS discover and drive ownership determination process, the RAID controllers 104 begin establishing their respective affiliations with the SATA disks 106 within the SAS expanders 102. FIG. 3 describes this process generally, and FIG. 4 describes in more detail the steps taken by each RAID controller 104 individually. Flow of FIG. 3 begins at block 302.

At block 302, a SAS configuration change event occurs. In response, each of the RAID controllers 104 attempts to obtain ownership of a drive discovery lock. In one embodiment, the code 214 of FIG. 2 includes code for implementing a distributed lock manager (DLM) similar to the DLM included in version 2.6.16 of the Linux kernel. However, the present invention is not limited to the particular implementation of the drive discovery lock; rather, any lock mechanism that enables a first of the RAID controllers 104 to obtain exclusive access to the SAS domain 100 may be employed. That is, the lock mechanism must provide a deterministic means of enabling the first RAID controller 104 to exclude the second RAID controller 104 from transmitting commands on the SAS domain 100 while the lock is owned by the first RAID controller 104. Flow proceeds to block 304.

At block 304, a first of the RAID controllers 104 obtains ownership of the drive discovery lock. In one embodiment, either RAID controller 104 may obtain ownership of the drive discovery lock first. The first RAID controller 104 then performs the SAS discover process, determines the ownership of each SATA disk 106, and populates the cmdForward flags 212 as described with respect to FIG. 4. The first RAID controller 104 then clears all affiliations, releases the drive discovery lock, and informs the partner RAID controller 104, according to FIG. 4. Flow proceeds to block 306.

Figure 4:
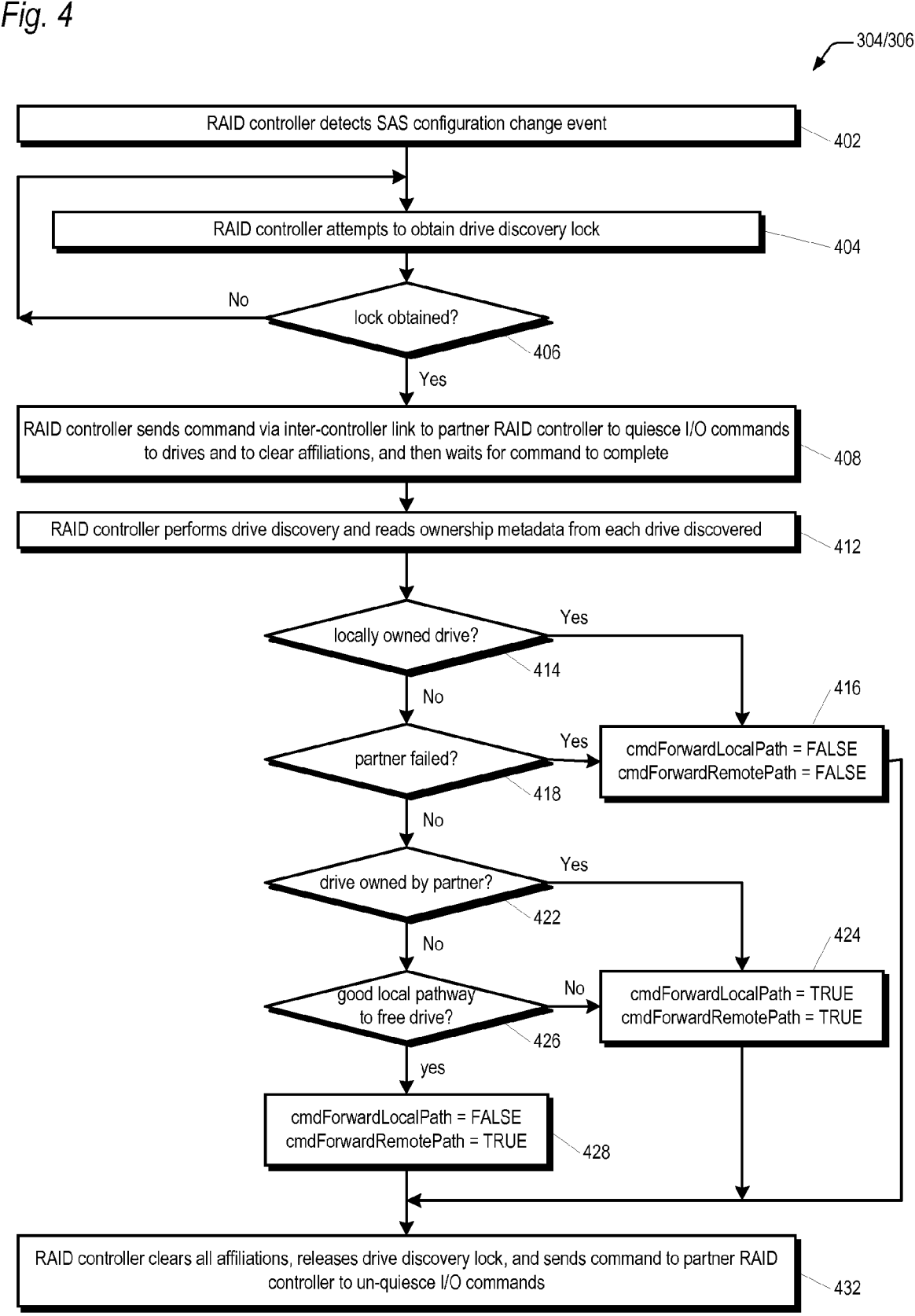
FIG. 4 is a flowchart illustrating in more detail the steps taken at blocks 304 and 306 of FIG. 3 by each RAID controller in response to a SAS configuration change event according to the present invention.

At block 306, the second RAID controller 104 receives notification from the first RAID controller 104 that it has released the drive discovery lock, and responsively obtains the drive discovery lock, performs the SAS discover process, determines the ownership of each SATA disk 106, populates the cmdForward flags 212, clears the affiliations, releases the drive discovery lock, and informs the partner RAID controller 104, according to FIG. 4. Flow proceeds to block 308.

At block 308, normal operation resumes, and each of the RAID controllers 104 begins sending commands to its respectively owned SATA disks 106, which results in affiliations being created between the respective RAID controller 104 and the owned SATA disks 106 within the SAS expanders 102 of FIG. 1 in the pathway by which the commands are sent. In the case of free SATA disks 106, the RAID controllers 104 only send commands via their local pathway so that affiliations are only established within the SAS expanders 102 in the local pathway. This advantageously enables each RAID controller 104 to send commands to an free SATA disk 106 via its local pathway without regard to affiliations that might have been established by the partner RAID controller 104 via its local pathway, thereby facilitating the efficient sharing of SATA disks 106 within the active-active RAID controller 104 system 100. Flow ends at block 308.

Referring now to FIG. 4, a flowchart illustrating in more detail the steps taken at blocks 304 and 306 of FIG. 3 by each RAID controller 104 in response to a SAS configuration change event according to the present invention is shown. Flow begins at block 402.

At block 402, the RAID controller 104 detects a SAS configuration change event. The SAS interface 206 of FIG. 2 detects the SAS configuration change event by receiving the BROADCAST from the SAS expander 102 to which it is connected. The SAS interface 206 notifies the microprocessor 202 of FIG. 2 of the SAS configuration change event. In one embodiment, the SAS interface 206 generates an interrupt to the microprocessor 202 to communicate the SAS configuration change event. In one embodiment, the code 214 of FIG. 2 executed by the microprocessor 202 includes relatively low-level code for controlling the SAS interface 206 and relatively high-level code for performing RAID control functions. The microprocessor 202 invokes the SAS interface 206 control code in response to the notification of the SAS configuration change event, which in turn notifies the RAID control code. Flow proceeds to block 404.

At block 404, the RAID controller 104 attempts to obtain the drive discovery lock. In one embodiment, it is the upper-level RAID control code that attempts to obtain the drive discovery lock. Advantageously, because the upper-level RAID control code obtains the drive discovery lock and sends the quiesce command to the partner RAID controller 104 before the lower-level SAS interface 206 code performs the SAS discover process, the SAS interface 206 code can perform the SAS discover process without regard to affiliations. That is, existing SAS interface 206 code that was previously employed with SAS disks or with SATA disks in a single initiator system may continue to be employed with SATA disks 106 on the domain 100 without modification with respect to SATA disk 106 affiliations. Flow proceeds to decision block 406.

At decision block 406, the RAID controller 104 determines whether it has obtained the drive discovery lock. If so, flow proceeds to block 408; otherwise, flow returns to block 404.

At block 408, the RAID controller 104 sends a command to its partner RAID controller 104 via the inter-controller communications link 118. The command instructs the partner RAID controller 104 to first quiesce, i.e., stop transmitting and allow all outstanding commands to complete, all commands to the SATA disks 106. The command also instructs the partner RAID controller 104 to then clear all affiliations within SAS expanders 102 for all of the SATA disks 106. The RAID controller 104 then waits for the partner RAID controller 104 to complete the command, i.e., waits until all commands are quiesced and all affiliations are cleared. In one embodiment, the partner RAID controller 104 clears the affiliations by transmitting clear affiliation commands to the SAS expanders 102, rather than by resetting the PHYs. Flow proceeds to block 412.

At block 412, the RAID controller 104 performs the SAS discover process and reads the ownership metadata 116 from each discovered SATA disk 106. Flow proceeds to decision block 414. The RAID controller 104 performs the steps of blocks 414 through 428 for each SATA disk 106 discovered in block 412.

At decision block 414, the RAID controller 104 makes a determination for each discovered SATA disk 106 regarding whether the RAID controller 104 itself owns the SATA disk 106, based on the ownership metadata 116 read at block 412. If the RAID controller 104 does not own the SATA disk 106, flow proceeds to decision block 418; otherwise, flow proceeds to block 416.

At block 416, since the RAID controller 104 owns the SATA disk 106, the RAID controller 104 sets the cmdForward flag 212 for both its local and remote path to a FALSE value to indicate that, for both pathways, commands destined for the SATA disk 106 are to be transmitted directly to the SAS expander 102 connected to the RAID controller 104 for transmission to the SATA disk 106. Flow proceeds to block 432.

At decision block 418, the RAID controller 104 determines whether the partner RAID controller 104 is in a failed state, i.e., whether the partner RAID controller 104 is non-operational. In one embodiment, the RAID controller 104 microprocessor 202 reads a state variable that is set at block 502 of FIG. 5 in response to detection of a failure of the partner RAID controller 104. If the partner RAID controller 104 has failed, flow proceeds to block 416 so that the cmdForward flags 212 will be set to prevent the RAID controller 104 from forwarding commands to the partner RAID controller 104; otherwise, flow proceeds to decision block 422.

At decision block 422, the RAID controller 104 determines whether the partner RAID controller 104 owns the SATA disk 106, based on the ownership metadata 116 read at block 412. If the partner RAID controller 104 does not own the SATA disk 106, flow proceeds to decision block 426; otherwise, flow proceeds to block 424.

At block 424, since the partner RAID controller 104 owns the SATA disk 106, the RAID controller 104 sets the cmdForward flag 212 for both its local and remote path to a TRUE value to indicate that, for both pathways, commands destined for the SATA disk 106 are to be forwarded via the inter-controller communications link 118 to the partner RAID controller 104 so that the partner RAID controller 104 can transmit the forwarded command to the SATA disk 106. Flow proceeds to block 432.

At decision block 426, the SATA disk 106 is a free SATA disk 106, i.e., it is not owned by either RAID controller 104. Therefore, the RAID controller 104 determines whether the local pathway to the free SATA disk 106 is good, i.e., operational. If not, flow proceeds to block 424 so that all commands destined for the SATA disk 106 are forwarded via the inter-controller communications link 118 to the partner RAID controller 104 so that the partner RAID controller 104 can transmit the forwarded command to the SATA disk 106; otherwise, flow proceeds to block 428.

At block 428, since the SATA disk 106 is a free disk and the RAID controller 104 has a good pathway to the SATA disk 106, the RAID controller 104 sets the cmdForward flag 212 for its local path to a FALSE value to indicate that, with respect to the local pathway, commands destined for the SATA disk 106 are to be transmitted directly to the attached SAS expander 102 for transmission to the SATA disk 106. In contrast, the RAID controller 104 sets the cmdForward flag 212 for its remote path to a TRUE value to indicate that, with respect to the remote pathway, commands destined for the SATA disk 106 are to be forwarded via the inter-controller communications link 118 to the partner RAID controller 104 so that the partner RAID controller 104 can transmit the forwarded command to the SATA disk 106. Flow proceeds to block 432.

At block 432, the RAID controller 104 clears all affiliations with all the SATA disks 106 within each SAS expander 102 of the system 100, so that the partner RAID controller 104 can establish affiliations with the SATA disks 106 it owns (or with free SATA disks 106 via its local pathway), as described with respect to block 308 of FIG. 3. The RAID controller 104 also releases the drive discovery lock and sends a command to its partner RAID controller 104 via the inter-controller communications link 118 instructing the partner RAID controller 104 to un-quiesce, i.e., resume transmitting, commands to the SATA disks 106. In one embodiment, it is the upper-level RAID control code that clears the affiliations, releases the drive discovery lock, and sends the un-quiesce command to the partner RAID controller 104. Flow ends at block 432.

As may be observed from study of FIG. 4, after the steps of FIG. 4 have been performed, each RAID controller 104 leaves all affiliations cleared and cmdForward flags 212 set appropriately. Consequently, the RAID controller 104 that owns a SATA disk 106 will be the first RAID controller 104 to send a command to the SATA disk 106, thereby establishing an affiliation with the SATA disk 106. The owner will be the first to send a command because, regardless of which RAID controller 104 in time decides to send a command first, the first command will either be directly transmitted by the owning RAID controller 104 or will be forwarded via the inter-controller communications link 118 to the owning RAID controller 104 by the non-owning RAID controller 104. Furthermore, with respect to free SATA disks 106, it does not matter which RAID controller 104 sends a command first, thereby establishing the affiliation, because the RAID controllers 104 restrict themselves to only sending commands along their local pathways. This rule is held even in the case where a RAID controller 104 does not have a local pathway to a free SATA disk 106 because the RAID controller 104 forwards the command to the partner RAID controller 104 so that the partner RAID controller 104 can send the command via its local pathway, based on the cmdForward flag 212 settings at block 424 of FIG. 4.

Figure 5:
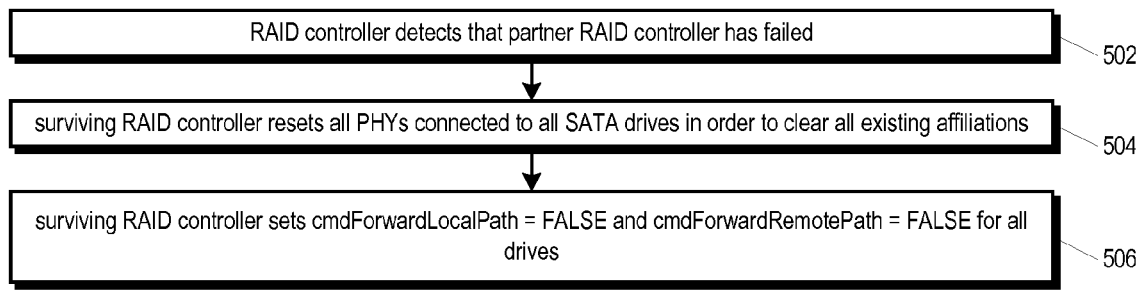
FIG. 5 is a flowchart illustrating operation of the active-active RAID system of FIG. 1 in response to the failure of one of the RAID controllers according to the present invention.

Referring now to FIG. 5, a flowchart illustrating operation of the active-active RAID system 100 of FIG. 1 in response to the failure of one of the RAID controllers 104 according to the present invention is shown. Flow begins at block 502.

At block 502, one of the RAID controllers 104 of FIG. 1 detects that its partner RAID controller 104 has failed. Flow proceeds to block 504.

At block 504, the surviving RAID controller 104, i.e., the RAID controller 104 that detected the failure of its partner, resets all PHYs connected to all SATA disks 106 in the system 100 in order to clear all existing affiliations. The PHY reset method must be used because some of the affiliations may have been made by the failed RAID controller 104 rather than the surviving RAID controller 104. Flow proceeds to block 506.

At block 506, the surviving RAID controller 104, for all SATA disks 106, sets the cmdForward flag 212 for both its local and remote path to a FALSE value to indicate that, for both pathways, commands destined for the SATA disk 106 are to be transmitted directly to the SAS expander 102 connected to the RAID controller 104 for transmission to the SATA disk 106, rather than forwarding commands to the failed partner RAID controller 104. Flow ends at block 506.

Figure 6:
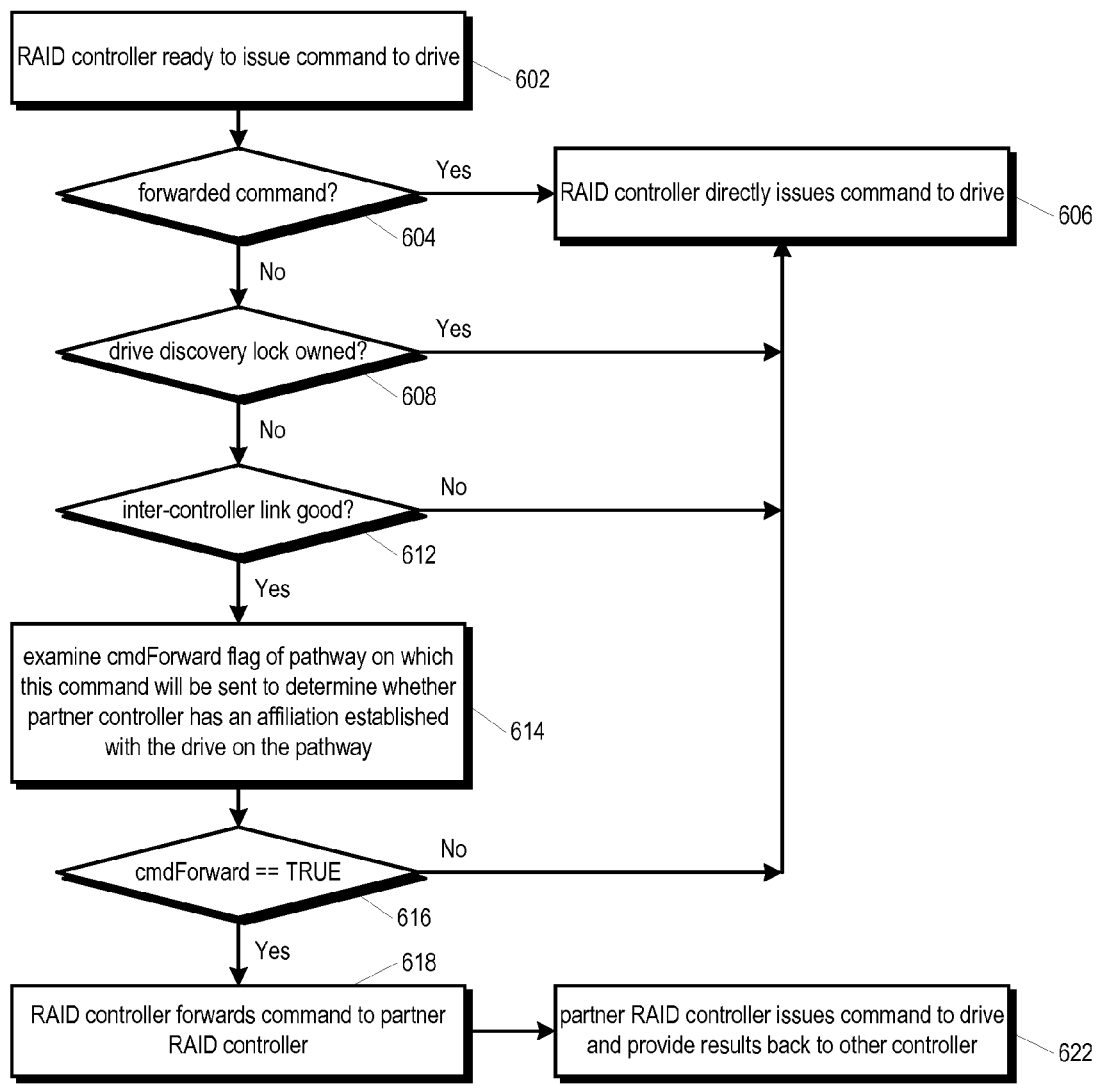
FIG. 6 is a flowchart illustrating operation of the active-active RAID system of FIG. 1 to perform command forwarding according to the present invention.

Referring now to FIG. 6, a flowchart illustrating operation of the active-active RAID system 100 of FIG. 1 to perform command forwarding according to the present invention is shown. Flow begins at block 602.

At block 602, one of the RAID controllers 104 of FIG. 1 is ready to send a command to one of the SATA disks 106 of FIG. 1. Flow proceeds to decision block 604.

At decision block 604, the RAID controller 104 determines whether the command it is ready to send has been forwarded to the RAID controller 104 from the partner RAID controller 104. If so, flow proceeds to block 606; otherwise, flow proceeds to decision block 608.

At block 606, the RAID controller 104 directly issues the command to the SATA disk 106. More specifically, the RAID controller 104 transmits the command to the SAS expander 102 connected to the RAID controller 104, and the SAS expander 102 routes the command downstream in the SAS domain to the SATA disk 106. If the SATA disk 106 is connected to the SAS expander 102, then the SAS expander 102 transmits the command to the SATA disk 106. If the SATA disk 106 is connected to a downstream SAS expander 102, then the SAS expander 102 transmits the command to the downstream SAS expander 102, which in turn transmits the command to the SATA disk 106. Flow ends at block 606.

At decision block 608, the RAID controller 104 determines whether the drive discovery lock is currently owned by the RAID controller 104, indicating that the RAID controller 104 is currently performing the SAS discover and driver ownership process of FIG. 4. If so, flow proceeds to block 606 such that the RAID controller 104 directly issues the command to the SATA disk 106; otherwise, flow proceeds to decision block 612.

At decision block 612, the RAID controller 104 determines whether the inter-controller communications link 118 is operational. If not, flow proceeds to block 606; otherwise, flow proceeds to block 614.

At block 614, the RAID controller 104 examines the cmdForward flag 212 associated with the pathway on which the command is to be sent to the SATA disk 106. Each RAID controller 104 has the ability to include information within the command that instructs the SAS expanders 102 of the domain 100 which pathway to direct the command through to the SATA disk 106. Thus, if the command is to be sent via the local pathway, the microprocessor 202 examines the cmdForwardLocalPath flag 212; if the command is to be sent via the remote pathway, the microprocessor 202 examines the cmdForwardRemotePath flag 212. The microprocessor 202 examines the cmdForward flag 212 to determine whether the partner RAID controller 104 has established an affiliation with the SATA disk 106 on the specified pathway. Flow proceeds to decision block 616.

At decision block 616, the RAID controller 104 determines whether the cmdForward flag 212 is TRUE. If not, flow proceeds to block 606; otherwise, flow proceeds to block 618.

At block 618, the RAID controller 104 forwards the command to the partner RAID controller 104 via the inter-controller communications link 118. Flow proceeds to block 622.

At block 622, the partner RAID controller 104 receives the command and directly issues the command to the SATA disk 106. When the SATA disk 106 completes the command back to the partner RAID controller 104, the partner RAID controller 104 provides the results of the command via the inter-controller communications link 118 to the RAID controller 104. In particular, the partner RAID controller 104 provides command completion status to the RAID controller 104 via the inter-controller communications link 118. Additionally, if the command was a READ command or other command that returns data, the partner RAID controller 104 provides the returned data to the RAID controller 104 via the inter-controller communications link 118 prior to providing the command completion status. Flow ends at block 622.

As may be observed from FIG. 6, command forwarding via the inter-controller communications link 118 is used to avoid affiliation conflicts between the two RAID controllers 104 by having the affiliated RAID controller 104 transmit the command to the SATA disk 106 via the SAS domain on behalf of the non-affiliated RAID controller 104. Although the drive discovery lock solution is advantageously employed during the SAS discover and drive ownership determination process in response to a SAS configuration change event, command forwarding via the inter-controller communications link 118 is a superior solution during normal operations. This is because when the lock is owned by one of the RAID controllers 104, the other RAID controller 104 is essentially idle, since it voluntarily refrains from transmitting commands to the SATA disks 106; however, the command forwarding mechanism described herein enables both RAID controllers 104 in the active-active system 100 to concurrently transmit commands to the SATA disks 106, thereby achieving efficient sharing of the SATA disks 106, even though the SATA disks 106 do not support the ability to concurrently receive and process commands from multiple initiators.

Operation of the active-active RAID system 100 of FIG. 1 has been described in which affiliations are established based on the ownership state of each SATA disk 106. In particular, the drive discovery lock is employed during a scenario in which a change in the SAS configuration has been detected. Furthermore, the ownership state-based affiliation information is used during normal operation of the system 100 in which a non-affiliated RAID controller 104 forwards commands to the affiliated partner RAID controller 104 via the inter-controller communications link 118. Operation of the active-active RAID system 100 will now be described with respect to FIGS. 7 through 9 during scenarios in which the ownership state of a SATA disk 106 is changed.

One example of a scenario in which the ownership of a SATA disk 106 changes is when one of the RAID controllers 104 previously failed and the surviving RAID controller 104 took ownership of the SATA disks 106 that had been owned by the failed RAID controller 104. Once the failed RAID controller 104 has been repaired or replaced with a new RAID controller 104, the system 100 performs a failback operation that restores the system 100 to a redundant state with respect to the RAID controllers 104. A failback operation may be user-initiated or may be automatically initiated in response to detection of repair or replacement of the failed RAID controller 104, such as a hot-plug insertion of the RAID controller 104. The failback operation involves changing ownership of the SATA disks 106 to the repaired or new RAID controller 104. Another example is when the user requests a change of SATA disk 106 ownership. The user might request such a change for performance reasons such as load balancing, for user access permission reasons, to make a SATA disk 106 a hot spare or available, and so forth. Another example is when the user configures the creation of a drive array, which necessarily involves changing a SATA disk 106 from free (i.e., not owned by either of the RAID controllers 104) to owned by one of the RAID controllers 104, or the deletion of a drive array, which necessarily involves changing a SATA disk 106 from owned by one of the RAID controllers 104 to free. Another example is when a redundant drive array suffers a failure of one of its SATA disks 106. In this case, the RAID controller 104 may, either automatically or in response to user input, convert a free SATA disk 106 that is a hot spare to being owned by one of the RAID controllers 104 for inclusion in the damaged drive array for reconstruction thereof.

Figure 7:
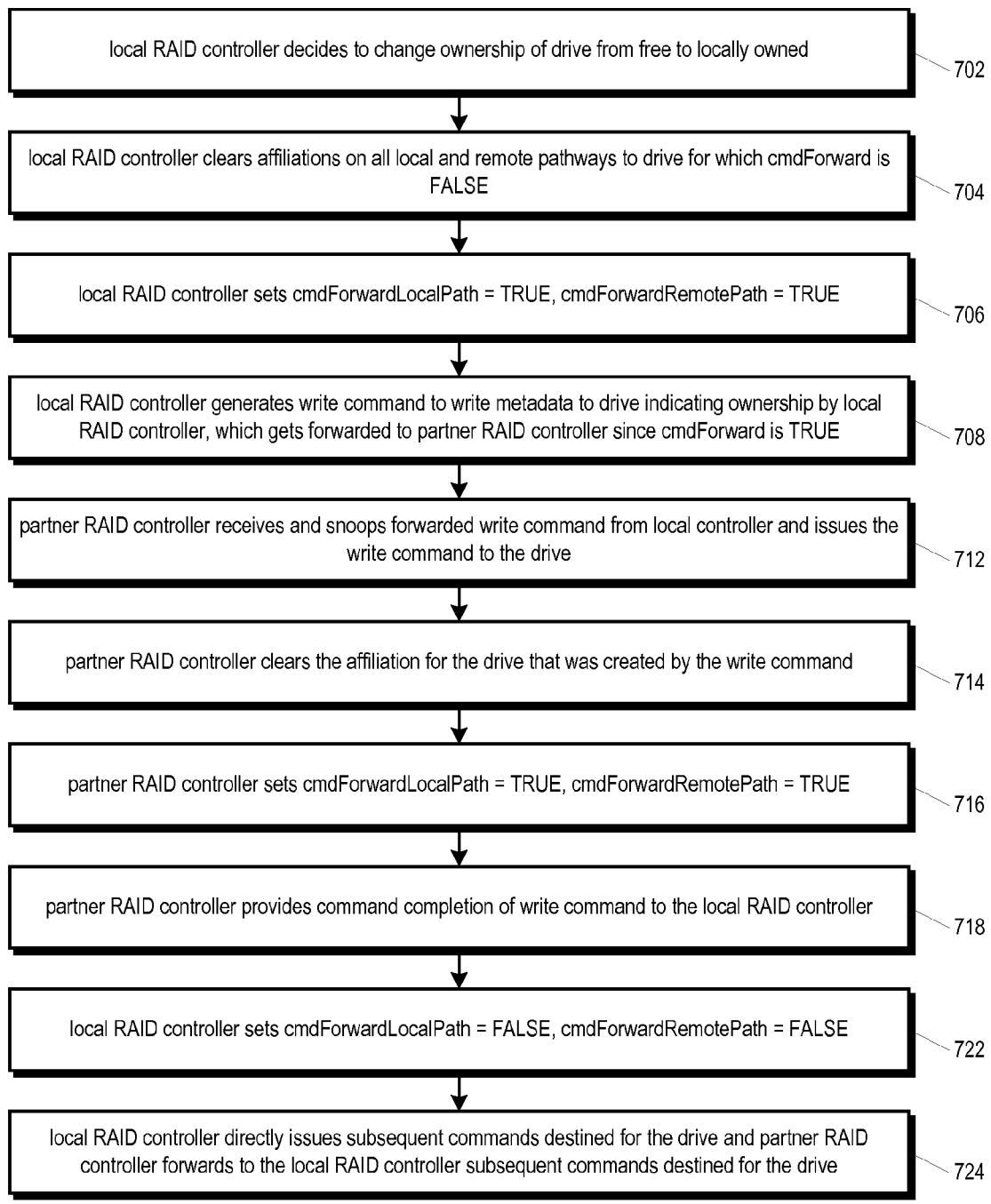
FIG. 7 is a flowchart illustrating operation of the active-active RAID system of FIG. 1 to cause a free SATA disk of FIG. 1 to be owned by one of the RAID controllers of FIG. 1 according to the present invention.

Referring now to FIG. 7, a flowchart illustrating operation of the active-active RAID system 100 of FIG. 1 to cause a free SATA disk 106 of FIG. 1 to be owned by one of the RAID controllers 104 of FIG. 1 according to the present invention is shown. Flow begins at block 702.

At block 702, one of the RAID controllers 104 of FIG. 1, referred to here as the local RAID controller 104, decides to change ownership of a SATA disk 106 from a free state to a state of owned by the local RAID controller 104. As discussed above, examples of scenarios in which this operation is necessary are swapping in a hot spare, creation of a drive array, or user request. Flow proceeds to block 704.

At block 704, the local RAID controller 104 clears affiliations on all local and remote SAS pathways to the SATA disk 106 for which the cmdForward flag 212 is FALSE. The local RAID controller 104 clears the affiliations by sending a clear affiliation command to the appropriate SAS expanders 102, rather than resetting PHYs. Flow proceeds to block 706.

At block 706, the local RAID controller 104 sets the cmdForward flag 212 for both its local and remote paths to TRUE. Flow proceeds to block 708.

At block 708, the local RAID controller 104 generates a WRITE command to write the ownership metadata 116 to the SATA disk 106 to indicate ownership by the local RAID controller 104. The WRITE command gets forwarded by the local RAID controller 104 to the partner RAID controller 104 because the cmdForward flags 212 for both pathways are TRUE. Flow proceeds to block 712.

At block 712, the partner RAID controller 104 receives the forwarded WRITE command from the local RAID controller 104, snoops the forwarded WRITE command, and detects that it is destined for the sector of the SATA disk 106 used to store the ownership metadata 116. This snooped knowledge dictates the subsequent steps performed by the partner RAID controller 104 at blocks 714 through 718. The partner RAID controller 104 then issues the WRITE command to the SATA disk 106 specified in the command. That is, the partner RAID controller 104 transmits the command to the SAS expander 102 connected to the partner RAID controller 104, which routes the command out the appropriate port for transmission to the SATA disk 106. Flow proceeds to block 714.

At block 714, the partner RAID controller 104 clears the affiliation for the SATA disk 106 that was created by the WRITE command. That is, when the partner RAID controller 104 issued the WRITE command to the SATA disk 106, an affiliation was created in one or more of the SAS expanders 102 in the SAS domain 100. The partner RAID controller 104 now clears those affiliations. Flow proceeds to block 716.

At block 716, the partner RAID controller 104 sets the cmdForward flag 212 for both its local and remote pathway to TRUE. Flow proceeds to block 718.

At block 718, the partner RAID controller 104 provides a command completion of the WRITE command to the local RAID controller 104. Flow proceeds to block 722.

At block 722, the local RAID controller 104 sets the cmdForward flag 212 for both its local and remote pathway to FALSE. Now the SATA disk 106 is owned by the local RAID controller 104, as indicated by the ownership metadata 116, and the cmdForward flags 212 are set appropriately such that affiliations will be created for the local RAID controller 104 with the SATA disk 106, and all commands destined for the SATA disk 106, regardless of whether they are generated by the local RAID controller 104 or the partner RAID controller 104, will be issued by the local RAID controller 104. Flow proceeds to block 724.

At block 724, normal operation resumes in which the local RAID controller 104 directly issues subsequent commands destined for the SATA disk 106 to the SAS expander 102 connected to the local RAID controller 104, and the partner RAID controller 104 forwards to the local RAID controller 104 via the inter-controller communications link 118 subsequent commands destined for the SATA disk 106, as described above with respect to FIG. 6. Flow ends at block 724.

Figure 8:
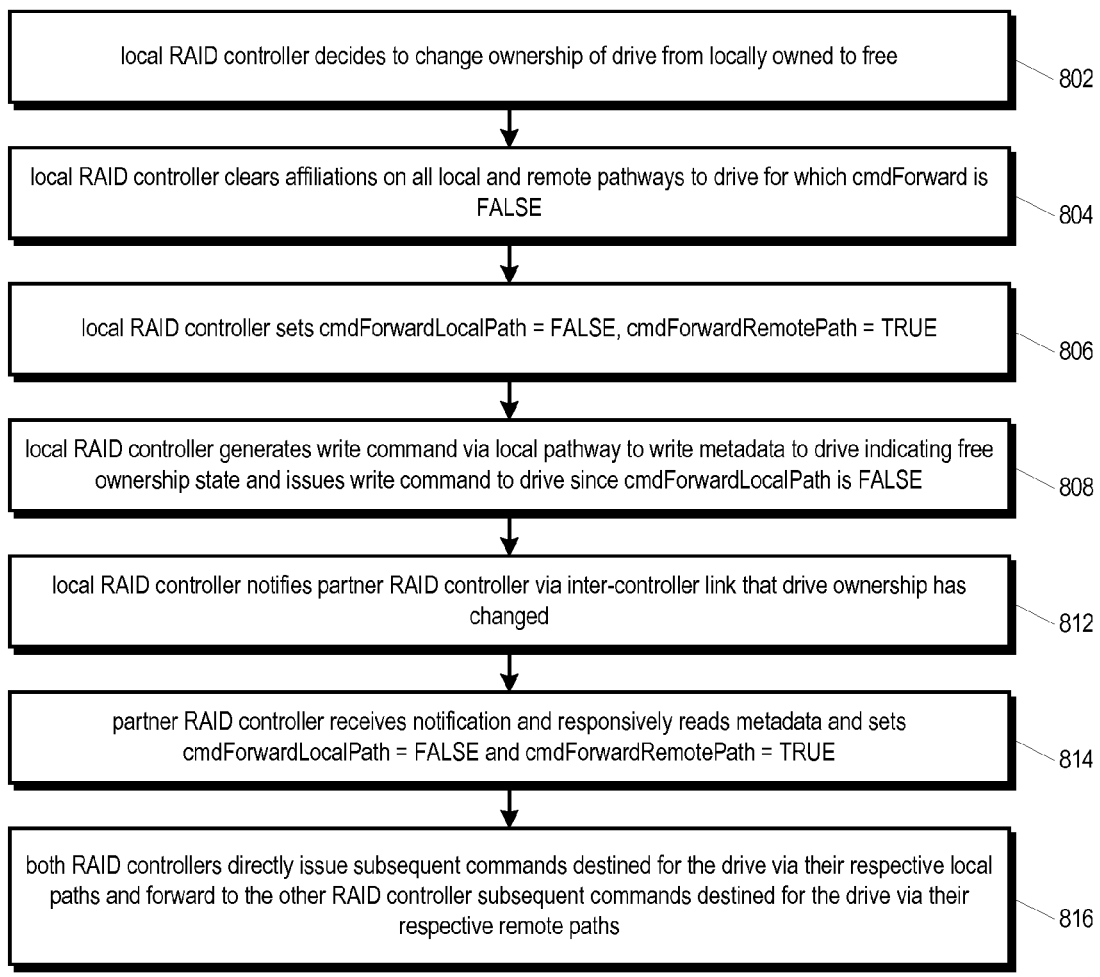
FIG. 8 is a flowchart illustrating operation of the active-active RAID system of FIG. 1 to cause a SATA disk owned by one of the RAID controllers of FIG. 1 to be free according to the present invention.

Referring now to FIG. 8, a flowchart illustrating operation of the active-active RAID system 100 of FIG. 1 to cause a SATA disk 106 owned by one of the RAID controllers 104 of FIG. 1 to be free according to the present invention is shown. Flow begins at block 802.

At block 802, the local RAID controller 104 decides to change ownership of a SATA disk 106 from a locally owned state to a free state. As discussed above, examples of scenario in which this operation is necessary are deletion of a drive array, or user request. Flow proceeds to block 804.

At block 804, the local RAID controller 104 clears affiliations on all local and remote SAS pathways to the SATA disk 106 for which the cmdForward flag 212 is FALSE. The local RAID controller 104 clears the affiliations by sending a clear affiliation command to the appropriate SAS expanders 102, rather than resetting PHYs. Flow proceeds to block 806.

At block 806, the local RAID controller 104 sets the cmdForward flag 212 for its local path to FALSE and sets the cmdForward flag 212 for its remote path to TRUE. Flow proceeds to block 808.

At block 808, the local RAID controller 104 generates a WRITE command to be issued via the local pathway to write the ownership metadata 116 to the SATA disk 106 to indicate the SATA disk 106 is free, i.e., not owned by either RAID controller 104. The local RAID controller 104 then directly issues the WRITE command to the SATA disk 106 because the cmdForward flag 212 for the local pathway is FALSE. Flow proceeds to block 812.

At block 812, the local RAID controller 104 notifies the partner RAID controller 104 that the SATA disk 106 ownership has changed. Flow proceeds to block 814.

At block 814, the partner RAID controller 104 receives the notification and responsively reads the ownership metadata 116 from the SATA disk 106. Because the ownership state of the SATA disk 106 is free, the partner RAID controller 104 responsively sets the cmdForward flag 212 for its local path to FALSE and sets the cmdForward flag 212 for its remote path to TRUE. Now the SATA disk 106 is in a free ownership state, as indicated by the ownership metadata 116, and the cmdForward flags 212 are set appropriately such that affiliations will be created for each of the RAID controllers 104 with the SATA disk 106 on their respective local pathways. Furthermore, all commands designated for issuance via a local pathway will be directly issued by each RAID controller 104, whereas commands designated for issuance via the remote pathway will be forwarded to the other RAID controller 104. Flow proceeds to block 816.

At block 816, normal operation resumes in which each of the RAID controllers 104 directly issues subsequent commands destined for the SATA disk 106 via the local pathway to the SAS expander 102 connected to the respective RAID controller 104, and forward to the other RAID controller 104 via the inter-controller communications link 118 subsequent commands destined for the SATA disk 106 via the remote pathway, as described above with respect to FIG. 6. Flow ends at block 816.

Figure 9:
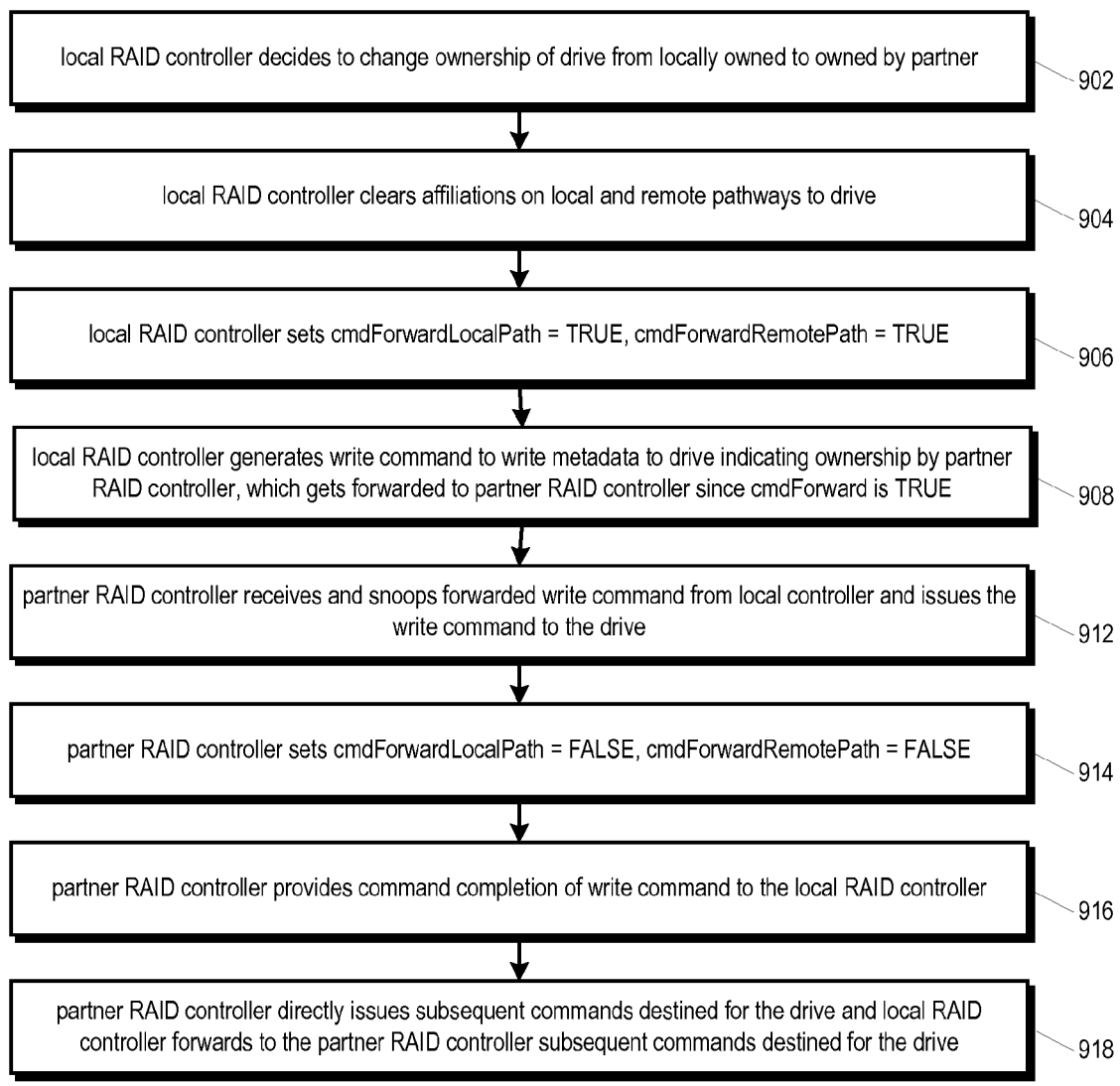
FIG. 9 is a flowchart illustrating operation of the active-active RAID system of FIG. 1 to cause a SATA disk owned by one of the RAID controllers of FIG. 1 to be owned by the other RAID controller 104 according to the present invention.

Referring now to FIG. 9, a flowchart illustrating operation of the active-active RAID system 100 of FIG. 1 to cause a SATA disk 106 owned by one of the RAID controllers 104 of FIG. 1 to be owned by the other RAID controller 104 according to the present invention is shown. Flow begins at block 902.

At block 902, the local RAID controller 104 decides to change ownership of a SATA disk 106 from a locally owned state to a partner owned state. As discussed above, examples of scenario in which this operation is necessary are failback or user request. Flow proceeds to block 904.

At block 904, the local RAID controller 104 clears affiliations on all local and remote SAS pathways to the SATA disk 106. The local RAID controller 104 clears the affiliations by sending a clear affiliation command to the appropriate SAS expanders 102, rather than resetting PHYs. Flow proceeds to block 906.

At block 906, the local RAID controller 104 sets the cmdForward flag 212 for both its local and remote paths to TRUE. Flow proceeds to block 908.

At block 908, the local RAID controller 104 generates a WRITE command to write the ownership metadata 116 to the SATA disk 106 to indicate the SATA disk 106 is owned by the partner RAID controller 104. The WRITE command gets forwarded by the local RAID controller 104 to the partner RAID controller 104 because the cmdForward flags 212 for both pathways are TRUE. Flow proceeds to block 912.

At block 912, the partner RAID controller 104 receives the forwarded WRITE command from the local RAID controller 104, snoops the forwarded WRITE command, and detects that it is destined for the sector of the SATA disk 106 used to store the ownership metadata 116. This snooped knowledge dictates the subsequent steps performed by the partner RAID controller 104 at blocks 914 through 916. The partner RAID controller 104 then issues the WRITE command to the SATA disk 106 specified in the command. That is, the partner RAID controller 104 transmits the command to the SAS expander 102 connected to the partner RAID controller 104, which routes the command out the appropriate port for transmission to the SATA disk 106. Flow proceeds to block 914.

At block 914, the partner RAID controller 104 sets the cmdForward flag 212 for both of its paths to FALSE. Flow proceeds to block 916.

At block 916, the partner RAID controller 104 provides a command completion of the WRITE command to the local RAID controller 104. Now the SATA disk 106 is owned by the partner RAID controller 104, as indicated by the ownership metadata 116, and the cmdForward flags 212 are set appropriately such that affiliations will be created for the partner RAID controller 104 with the SATA disk 106 and, all commands destined for the SATA disk 106, regardless of whether they are generated by the local RAID controller 104 or the partner RAID controller 104, will be issued by the partner RAID controller 104. Flow proceeds to block 918.

At block 918, normal operation resumes in which the partner RAID controller 104 directly issues subsequent commands destined for the SATA disk 106 to the SAS expander 102 connected to the partner RAID controller 104, and the local RAID controller 104 forwards to the partner RAID controller 104 via the inter-controller communications link 118 subsequent commands destined for the SATA disk 106, as described above with respect to FIG. 6. Flow ends at block 918.

In one embodiment, the code 214 executed by the microprocessor 202 that performs the various steps described herein, comprises various levels. For example, a relatively low-level code 214 performs the SAS discover process and a relatively high-level code 214 generates the I/O commands, such as READ and WRITE commands to transfer user data and such as the maintenance-type commands described above. A mid-level code 214 performs the drive discovery lock allocation, command forwarding determination, and portions of the drive ownership change functions which are necessary to use SATA disks in the active-active RAID system 100 and their associated affiliations maintained by the SAS expanders 102. That is, the mid-level code 214 includes the SATA/affiliation-specific code 214.

In addition to the efficiency advantages described herein by the sharing of SATA disks by active-active RAID controllers according to the embodiments described, the embodiments also provide the additional advantage of enabling the preservation of a large base of existing code without requiring modifications to support SATA disks, which do not support multiple initiators. For example, the high-level RAID controller code is often leveraged from a common code base that supports more than one disk channel interface. Code that was written to work with, for example, multi-initiator-capable SCSI and FibreChannel disks will not work with SATA disks without modifications that consider whether affiliations exist before sending a command. Advantageously, the present invention enables the already existing high-level code to be reused with little or no modification, since the mid-level code 214 includes the SATA/affiliation-specific code 214. Additionally, portions of the low-level SAS discover process code may often be specific to the particular SAS interface controller 206 present on the RAID controller 104, and may even by supplied by the manufacturer of the SAS interface controller 206. Advantageously, the present invention enables the already existing low-level code to be reused with little or no modification, since the mid-level code 214 includes the SATA/affiliation-specific code 214.

Although the present invention and its objects, features, and advantages have been described in detail, other embodiments are encompassed by the invention. For example, although embodiments have been described in which the inter-controller link 118 is a PCI-Express link, the invention is not limited thereto, and other embodiments are contemplated that facilitate communications between the RAID controllers 104, including but not limited to, Fibre Channel, SAS, SCSI, RS-232, $I^2C$, Ethernet, InfiniBand, and the like. The inter-controller communications link 118 may be a dedicated link used only for communication between the RAID controllers 104, as described above, or it may be a link shared for other purposes, such as a disk connection. For example, the SAS links of the SAS domain could be used to perform the command forwarding described herein. Additionally, although embodiments have been described in which each of the RAID controllers is connected to a single SAS domain, embodiments are contemplated in which each of the RAID controllers may be connected to a plurality of independent SAS domains, and the drive discovery lock, command forwarding, and drive ownership change methods are performed on a per-SAS domain basis.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. An active-active redundant array of inexpensive disks (RAID) system for efficiently sharing Serial Advanced Technology Attachment (SATA) drives, comprising:

first and second RAID controllers, each configured to couple to a plurality of SATA drives via one or more Serial Attached SCSI (SAS) expanders, wherein said first RAID controller is configured to establish an affiliation in said one or more SAS expanders between said first RAID controller and each of a first subset of said plurality of SATA drives, and said second RAID controller is configured to establish an affiliation in said one or more SAS expanders between said second RAID controller and each of a second subset of said plurality of SATA drives, wherein said first and second subsets of said plurality of SATA drives are mutually exclusive; and a communications link, for coupling said first and second RAID controllers to facilitate communications therebetween;

wherein said first RAID controller is configured to transmit commands destined for said first subset of said plurality of SATA drives to said one or more SAS expanders, and is configured to forward commands destined for said second subset of said plurality of SATA drives on said communications link to said second RAID controller for said second RAID controller to responsively transmit to said one or more SAS expanders;

wherein said second RAID controller is configured to transmit commands destined for said second subset of said plurality of SATA drives to said one or more SAS expanders, and is configured to forward commands destined for said first subset of said plurality of SATA drives on said communications link to said first RAID controller for said first RAID controller to responsively transmit to said one or more SAS expanders.

2. The active-active RAID system of claim 1, wherein said first RAID controller is further configured to detect that said second RAID controller has failed and to responsively clear said established affiliations in said one or more SAS expanders between said second RAID controller and said second subset of said plurality of SATA drives.

3. The active-active RAID system of claim 2, wherein said first RAID controller is further configured to transmit said commands destined for said second subset of said plurality of SATA drives to said one or more SAS expanders, rather than forwarding said commands on said communications link to said second RAID controller, after said second RAID controller has failed.

4. The active-active RAID system of claim 2, wherein said first RAID controller is further configured to clear said established affiliations by resetting each SAS Physical Layer Device (PHY) connected to said second subset of said plurality of SATA drives.

5. The active-active RAID system of claim 1, wherein said first RAID controller is further configured to transmit said commands destined for said second subset of said plurality of SATA drives to said one or more SAS expanders, rather than forwarding said commands on said communications link to said second RAID controller, if said communications link has failed.

6. The active-active RAID system of claim 1, wherein said first RAID controller is further configured to transmit said commands destined for said second subset of said plurality of SATA drives to said one or more SAS expanders, rather than forwarding said commands on said communications link to said second RAID controller, if said first RAID controller is performing a SAS discover process to discover said plurality of SATA drives.

7. The active-active RAID system of claim 1, wherein said communications link comprises a Peripheral Component Interconnect (PCI) PCI-Express link.

8. The active-active RAID system of claim 1, further comprising:
a plurality of SAS multiplexers, connected to corresponding ones of said plurality of SATA drives, configured to enable first and second SAS expanders of said one or more SAS expanders to communicate with said plurality of SATA drives.

9. The active-active RAID system of claim 1, wherein said one or more SAS expanders comprises first and second SAS expanders, the active-active RAID system further comprising:
a SAS link connecting said first and second SAS expanders;
first SAS pathways, inclusive of said SAS link, connecting said first and second RAID controllers to said plurality of SATA drives;
second SAS pathways, exclusive of said SAS link, connecting said first and second RAID controllers to said plurality of SATA drives.

10. The active-active RAID system of claim 9, wherein said first and second RAID controllers are configured to establish an affiliation with each of a third subset of said plurality of SATA drives only in ones of said one or more SAS expanders along said first SAS pathways, and to refrain from establishing an affiliation with each of said third subset of said plurality of SATA drives in ones of said one or more SAS expanders along said second SAS pathways, wherein said first, second, and third subsets of said plurality of SATA drives are mutually exclusive.

11. The active-active RAID system of claim 10, wherein said first and second subset of said plurality of SATA drives are owned by said first and second RAID controllers, respectively, whereas said third subset of said plurality of SATA drives are owned by neither of said first and second RAID controllers.

12. A method for efficiently sharing Serial Advanced Technology Attachment (SATA) drives in an active-active redundant array of inexpensive disks (RAID) system having first and second RAID controllers coupled to a plurality of SATA drives via one or more SAS expanders and a communications link between the first and second RAID controllers, the method comprising:
establishing an affiliation in the one or more SAS expanders between the first RAID controller and each of a first subset of the plurality of SATA drives;
establishing an affiliation in the one or more SAS expanders between the second RAID controller and each of a second subset of the plurality of SATA drives, wherein the first and second subsets of the plurality of SATA drives are mutually exclusive;
transmitting, by the first RAID controller, commands destined for the first subset of said plurality of SATA drives to the one or more SAS expanders, and forwarding, by the first RAID controller, commands destined for the second subset of said plurality of SATA drives on the communications link to the second RAID controller for the second RAID controller to responsively transmit to the one or more SAS expanders; and
transmitting, by the second RAID controller, commands destined for the second subset of said plurality of SATA drives to the one or more SAS expanders, and forwarding, by the second RAID controller, commands destined for the first subset of said plurality of SATA drives on the communications link to the first RAID controller for the first RAID controller to responsively transmit to the one or more SAS expanders.

13. The method of claim 12, further comprising:
detecting that the second RAID controller has failed; and
clearing, by the first RAID controller, the established affiliations in the one or more SAS expanders between the second RAID controller and the second subset of the plurality of SATA drives, in response to said detecting.

14. The method of claim 13, further comprising:
transmitting, by the first RAID controller, the commands destined for the second subset of said plurality of SATA drives to the one or more SAS expanders, rather than forwarding the commands on the communications link to the second RAID controller, after the second RAID controller has failed.

15. The method of claim 13, wherein the first RAID controller said clearing the established affiliations comprises the first RAID controller resetting each SAS Physical Layer Device (PHY) connected to the second subset of the plurality of SATA drives.

16. The method of claim 12, further comprising:
detecting that the communications link has failed; and transmitting, by the first RAID controller, the commands destined for the second subset of said plurality of SATA drives to the one or more SAS expanders, rather than forwarding the commands on the communications link to the second RAID controller, in response to said detecting.

17. The method of claim 12, further comprising:
transmitting, by the first RAID controller, the commands destined for the second subset of said plurality of SATA drives to the one or more SAS expanders, rather than forwarding the commands on the communications link to the second RAID controller, if the first RAID controller is performing a SAS discover process to discover the plurality of SATA drives.

18. The method of claim 12, wherein the communications link comprises a Peripheral Component Interconnect (PCI) PCI-Express link.

19. The method of claim 12, wherein the one or more SAS expanders comprises first and second SAS expanders, and the active-active RAID system includes a SAS link connecting the first and second SAS expanders, first SAS pathways, inclusive of the SAS link, connecting the first and second RAID controllers to the plurality of SATA drives, and second SAS pathways, exclusive of the SAS link, connecting the first and second RAID controllers to the plurality of SATA drives, the method further comprising:
establishing, by the first and second RAID controllers, an affiliation with each of a third subset of the plurality of SATA drives only in ones of the one or more SAS expanders along the first SAS pathways; and
refraining, by the first and second RAID controllers, from establishing an affiliation with each of the third subset of the plurality of SATA drives in ones of the one or more SAS expanders along the second SAS pathways, wherein the first, second, and third subsets of the plurality of SATA drives are mutually exclusive.

20. The method of claim 19, wherein the first and second subset of the plurality of SATA drives are owned by the first and second RAID controllers, respectively, whereas the third subset of the plurality of SATA drives are owned by neither of the first and second RAID controllers.

21. An active-active redundant array of inexpensive disks (RAID) system for changing an ownership state stored on a shared Serial Advanced Technology Attachment (SATA) drive, comprising:
first and second RAID controllers;
a communications link, connecting said first and second RAID controllers; and
at least one Serial Attached SCSI (SAS) expander, configured to connect said first and second RAID controllers to the SATA drive;
wherein said first RAID controller is configured to clear at least one affiliation previously established in said at least one SAS expander between said first RAID controller and the SATA drive;
wherein said first RAID controller is configured to forward a command to write predetermined data to the SATA drive from said first RAID controller to said second RAID controller via said communications link, after clearing said affiliation, wherein said predetermined data indicates the ownership state of the SATA drive;
wherein said second RAID controller is configured to transmit said forwarded command to said at least one SAS expander for subsequent transmission by said at least one SAS expander to the SATA drive.

22. The active-active RAID system of claim 21, wherein the first RAID controller is further configured to forward to said second RAID controller via said communications link all commands destined for the SATA drive subsequent to said command to write said predetermined data to the SATA drive.

23. The active-active RAID system of claim 21, wherein the changing of the ownership state is from ownership by said first RAID controller to ownership by said second RAID controller, wherein said predetermined data indicates the SATA drive is owned by said second RAID controller rather than said first RAID controller.

24. The active-active RAID system of claim 23, wherein said first RAID controller is configured to clear said affiliation and forward said command in response to detecting initiation of a failback operation from said first RAID controller to said second RAID controller.

25. The active-active RAID system of claim 21, wherein the changing of the ownership state is from a free ownership state to ownership by said first RAID controller, wherein said predetermined data indicates the SATA drive is owned by said first RAID controller.

26. The active-active RAID system of claim 21, wherein said first RAID controller clears said at least one affiliation by transmitting a SAS clear affiliation command to said at least one SAS expander, rather than transmitting a SAS Physical Layer Device (PHY) reset command.

27. The active-active RAID system of claim 21, wherein said communications link comprises a Peripheral Component Interconnect (PCI) PCI-Express link coupling said first and second RAID controllers.

28. A method for changing an ownership state stored on a Serial Advanced Technology Attachment (SATA) drive within an active-active redundant array of inexpensive disks (RAID) system having first and second RAID controllers and at least one Serial Attached SCSI (SAS) expander connecting the first and second RAID controllers to the SATA drive, the method comprising:
clearing, by the first RAID controller, at least one affiliation previously established in the at least one SAS expander between the first RAID controller and the SATA drive;
forwarding, from the first RAID controller to the second RAID controller via a communications link, a command to write predetermined data to the SATA drive, after said clearing, wherein said predetermined data indicates the ownership state of the SATA drive; and
transmitting, by the second RAID controller, the command to the at least one SAS expander for subsequent transmission by the at least one SAS expander to the SATA drive, in response to said forwarding.

29. The method of claim 28, further comprising:
forwarding, from the first RAID controller to the second RAID controller via the communications link, all commands destined for the SATA drive subsequent to the command to write the predetermined data to the SATA drive.

30. The method of claim 28, wherein the changing of the ownership state is from ownership by the first RAID controller to ownership by the second RAID controller, wherein said predetermined data indicates the SATA drive is owned by the second RAID controller rather than the first RAID controller.

31. The method of claim 30, further comprising:
detecting initiation of a failback operation from the first RAID controller to the second RAID controller, prior to said clearing;
wherein said clearing and said forwarding are performed in response to said detecting.

32. The method of claim 28, wherein the changing of the ownership state is from a free ownership state to ownership by the first RAID controller, wherein said predetermined data indicates the SATA drive is owned by the first RAID controller.

33. The method of claim 28, wherein said clearing said at least one affiliation comprises transmitting a SAS clear affiliation command to said at least one SAS expander, rather than transmitting a SAS Physical Layer Device (PHY) reset command.

34. The method of claim 28, wherein said communications link comprises a Peripheral Component Interconnect (PCI) PCI-Express link coupling the first and second RAID controllers.

35. An active-active redundant array of inexpensive disks (RAID) system for changing an ownership state stored on a shared Serial Advanced Technology Attachment (SATA) drive, comprising:
    first and second RAID controllers; and
    first and second Serial Attached SCSI (SAS) expanders, configured to connect respective said first and second RAID controllers to the SATA drive;
    wherein the first RAID controller is configured to clear an affiliation previously established in the second SAS expander between the first RAID controller and the SATA drive;
    wherein the first RAID controller is configured to transmit to the first SAS expander a command to write predetermined data to the SATA drive for subsequent transmission by the first SAS expander to the SATA drive, after clearing the affiliation, wherein said predetermined data indicates a free ownership state of the SATA drive;
    wherein the first RAID controller is configured to notify the second RAID controller that the ownership state of the SATA drive has changed, after transmitting the command.

36. The active-active RAID system of claim 35, wherein the second RAID controller is configured to read the predetermined data from the SATA drive in response to the notification.

37. The active-active RAID system of claim 35, wherein the first RAID controller notifies the second RAID controller via a communications link coupling the first and second RAID controllers.

38. The active-active RAID system of claim 37, wherein said communications link comprises a Peripheral Component Interconnect (PCI) PCI-Express link.

39. The active-active RAID system of claim 37, wherein the first RAID controller is configured to issue first subsequent commands to the SATA drive only (1) via a first SAS path to the SATA drive exclusive of the second SAS expander and (2) by forwarding the first subsequent commands to the second RAID controller via the communications link for subsequent transmission by the second RAID controller via a second SAS path to the SATA drive exclusive of the first SAS expander, whereby the first RAID controller avoids establishing an affiliation within the second SAS expander between the first RAID controller and the SATA drive, and wherein the second RAID controller is configured to issue second subsequent commands to the SATA drive only (1) via the second SAS path and (2) by forwarding the second subsequent commands to the first RAID controller via the communications link for subsequent transmission by the first RAID controller via the first SAS path to the SATA drive, whereby the second RAID controller avoids establishing an affiliation within the first SAS expander between the second RAID controller and the SATA drive.

40. The active-active RAID system of claim 35, wherein said first RAID controller is configured to clear said affiliation and transmit said command in response to receiving a request to delete a drive array of which the SATA drive was previously a constituent drive.

41. The active-active RAID system of claim 35, wherein said first RAID controller clears the affiliation by transmitting a SAS clear affiliation command to the second SAS expander, rather than transmitting a SAS Physical Layer Device (PHY) reset command.

42. A method for changing an ownership state stored on a Serial Advanced Technology Attachment (SATA) drive within an active-active redundant array of inexpensive disks (RAID) system having first and second RAID controllers and respective first and second Serial Attached SCSI (SAS) expanders connecting the respective first and second RAID controllers to the SATA drive, the method comprising:
    clearing, by the first RAID controller, an affiliation previously established in the second SAS expander between the first RAID controller and the SATA drive;
    transmitting to the first SAS expander, by the first RAID controller, a command to write predetermined data to the SATA drive for subsequent transmission by the first SAS expander to the SATA drive, after said clearing, wherein said predetermined data indicates a free ownership state of the SATA drive; and
    notifying the second RAID controller, by the first RAID controller, that the ownership state of the SATA drive has changed, after said transmitting.

43. The method of claim 42, further comprising:
    reading from the SATA drive, by the second RAID controller, the predetermined data, in response to said notifying.

44. The method of claim 42, wherein said notifying comprises the first RAID controller notifying the second RAID controller via a communications link coupling the first and second RAID controllers.

45. The method of claim 44, wherein said communications link comprises a Peripheral Component Interconnect (PCI) PCI-Express link.

46. The method of claim 44, further comprising:
    issuing first subsequent commands to the SATA drive, by the first RAID controller, only (1) via a first SAS path to the SATA drive exclusive of the second SAS expander and (2) by forwarding the first subsequent commands to the second RAID controller via the communications link for subsequent transmission by the second RAID controller via a second SAS path to the SATA drive exclusive of the first SAS expander, whereby the first RAID controller avoids establishing an affiliation within the second SAS expander between the first RAID controller and the SATA drive; and
    issuing second subsequent commands to the SATA drive, by the second RAID controller, only (1) via the second SAS path and (2) by forwarding the second subsequent commands to the first RAID controller via the communications link for subsequent transmission by the first RAID controller via the first SAS path to the SATA drive, whereby the second RAID controller avoids establishing an affiliation within the first SAS expander between the second RAID controller and the SATA drive.

47. The method of claim 42, further comprising:
    receiving a request to delete a drive array of which the SATA drive was previously a constituent drive, prior to said clearing;
    wherein said clearing and said transmitting are performed in response to said receiving the request.

48. The method of claim 42, wherein said clearing the affiliation comprises transmitting a SAS clear affiliation command to the second SAS expander, rather than transmitting a SAS Physical Layer Device (PHY) reset command.

49. An active-active redundant array of inexpensive disks (RAID) system for sharing Serial Advanced Technology Attachment (SATA) drives, comprising:
- first and second RAID controllers; and
- at least one Serial Attached SCSI (SAS) expander, configured to connect said first and second RAID controllers to said SATA drives;
- wherein said first RAID controller is configured to obtain a lock that excludes said second RAID controller from accessing said SATA drives in response to receiving from said at least one SAS expander a SAS configuration change event broadcast primitive;
- wherein said first RAID controller is configured to send a command to said second RAID controller to clear all affiliations established in said at least one SAS expander between said second RAID controller and said SATA drives after obtaining said lock; and
- wherein said first RAID controller is configured to read ownership information stored on said SATA drives while said second RAID controller is excluded from accessing said SATA drives after sending said command.

50. The active-active RAID system of claim 49, wherein said first RAID controller is configured to establish within said at least one SAS expander an affiliation between said first RAID controller and each of said SATA drives owned by said first RAID controller.

51. The active-active RAID system of claim 49, further comprising:
- a communications link connecting said first and second RAID controllers;
- wherein said first RAID controller is configured to forward via said communications link to said second RAID controller commands destined for each of said SATA drives owned by said second RAID controller, for subsequent transmission by said second RAID controller to said SATA drives owned by said second RAID controller.

52. The active-active RAID system of claim 51, wherein said first RAID controller is configured to refrain from establishing within said at least one SAS expander an affiliation between said first RAID controller and each of said SATA drives owned by said second RAID controller.

53. The active-active RAID system of claim 49, wherein said command to clear all affiliations further commands said second RAID controller to temporarily cease transmitting commands to said SATA drives.

54. The active-active RAID system of claim 49, further comprising:
- first and second respective SAS pathways from said first and second RAID controllers to each of said SATA drives, said first and second respective SAS pathways comprising said at least one SAS expander;
- wherein said first RAID controller is configured to establish an affiliation within said at least one SAS expander along said first SAS pathway to each of said SATA drives not currently owned by either of said first and second RAID controllers; and
- wherein said second RAID controller is configured to establish an affiliation within said at least one SAS expander along said second SAS pathway to each of said SATA drives not currently owned by either of said first and second RAID controllers.

55. A method for sharing Serial Advanced Technology Attachment (SATA) drives by first and second redundant array of inexpensive disks (RAID) controllers within an active-active RAID system having at least one Serial Attached SCSI (SAS) expander connecting the first and second RAID controllers to the SATA drives, the method comprising:
- obtaining, by the first RAID controller, a lock that excludes the second RAID controller from accessing the SATA drives, in response to receiving from the at least one SAS expander a SAS configuration change event broadcast primitive;
- sending, by the first RAID controller, a command to the second RAID controller to clear all affiliations established in the at least one SAS expander between the second RAID controller and the SATA drives, after said obtaining the lock; and
- reading, by the first RAID controller, ownership information stored on the SATA drives, while the second RAID controller is excluded from accessing the SATA drives, after said sending the command.

56. The method of claim 55, further comprising:
establishing within said at least one SAS expander, by the first RAID controller, an affiliation between the first RAID controller and each of the SATA drives owned by the first RAID controller, based on said reading the ownership information.

57. The method of claim 55, further comprising:
forwarding, by the first RAID controller, to the second RAID controller commands destined for each of the SATA drives owned by the second RAID controller, based on said reading the ownership information, for subsequent transmission by the second RAID controller to the SATA drives owned by the second RAID controller, wherein said forwarding is performed via a communications link connecting the first and second RAID controllers.

58. The method of claim 57, further comprising:
refraining from establishing within said at least one SAS expander, by the first RAID controller, an affiliation between the first RAID controller and each of the SATA drives owned by the second RAID controller, based on said reading the ownership information.

59. The method of claim 55, wherein said command to clear all affiliations further commands the second RAID controller to temporarily cease transmitting commands to the SATA drives.

60. The method of claim 55, wherein first and second respective SAS pathways connect the first and second RAID controllers to each of the SATA drives, the first and second respective SAS pathways comprising the at least one SAS expander, the method further comprising:
- establishing, by the first RAID controller, an affiliation within said at least one SAS expander along the first SAS pathways to each of the SATA drives not currently owned by either of the first and second RAID controllers, based on said reading the ownership information; and
- establishing, by the second RAID controller, an affiliation within said at least one SAS expander along the second SAS pathways to each of the SATA drives not currently owned by either of the first and second RAID controllers, based on said reading the ownership information.

* * * * *